US007082094B2

(12) United States Patent
Morishima et al.

(10) Patent No.: US 7,082,094 B2
(45) Date of Patent: Jul. 25, 2006

(54) OPTICAL RECORDING APPARATUS WITH DRAWING CAPABILITY OF VISIBLE IMAGE ON DISK FACE

(75) Inventors: Morito Morishima, Fukuroi (JP); Akira Usui, Hamamatsu (JP); Yoshihiko Shiozaki, Toyoda-cho (JP)

(73) Assignee: Yamaha Corporation, Hamamatsu (JP)

( * ) Notice: Subject to any disclaimer, the term of this patent is extended or adjusted under 35 U.S.C. 154(b) by 424 days.

(21) Appl. No.: 10/282,671

(22) Filed: Oct. 29, 2002

(65) Prior Publication Data

US 2003/0117932 A1   Jun. 26, 2003

(30) Foreign Application Priority Data

Oct. 31, 2001  (JP)  .............................. 2001-335608
Apr. 24, 2002  (JP)  .............................. 2002-122706

(51) Int. Cl.
    *G11B 7/00*  (2006.01)
(52) U.S. Cl. .................... 369/116; 369/274; 346/137
(58) Field of Classification Search ................ 369/116; 346/137; 347/105, 224–264 MS
    See application file for complete search history.

(56) References Cited

U.S. PATENT DOCUMENTS

| 5,608,718 | A | 3/1997 | Schiewe |
| 6,088,323 | A | 7/2000 | Kobayashi et al. |
| 6,490,239 | B1* | 12/2002 | Nagasaka ................. 369/275.4 |
| 6,754,158 | B1* | 6/2004 | Kobayashi et al. ....... 369/59.11 |
| 2001/0026531 | A1* | 10/2001 | Onodera et al. ............ 369/284 |
| 2002/0191517 | A1* | 12/2002 | Honda et al. ............ 369/53.29 |
| 2003/0001943 | A1* | 1/2003 | Hirotsune et al. .......... 347/224 |
| 2003/0107959 | A1* | 6/2003 | Norton et al. ........... 369/30.23 |
| 2003/0161224 | A1* | 8/2003 | Anderson et al. ........ 369/30.58 |

FOREIGN PATENT DOCUMENTS

| EP | 0896332 A1 | 7/1998 |
| JP | 6036514 | 2/1994 |

\* cited by examiner

*Primary Examiner*—Andrea Wellington
*Assistant Examiner*—Lixi Chow
(74) *Attorney, Agent, or Firm*—Pillsbury Winthrop Shaw Pittman LLP

(57) ABSTRACT

An optical disk apparatus records information by irradiating a laser beam from a pickup onto an optical disk. A scanning section scans the laser beam relative to the optical disk. A recording control section controls the scanning section to effect recording of information. A drawing control section is provided for controlling the pickup and the scanning section to effect drawing of a visible image on the optical disk according to image information, such that the laser beam is changed between a first intensity incapable of acting on the optical disk and a second intensity capable of acting on the optical disk. A servo section periodically detects the laser beam reflected back from the optical disk when the laser beam has the first intensity, and servo-controls the irradiating of the laser beam during the drawing of the visible image based on the detection of the laser beam. The drawing control section controls the pickup for forcibly changing the laser beam to the first intensity from the second intensity when the second intensity is maintained over a predetermined period pursuant to the image information, thereby enabling the servo section to detect the laser beam having the first intensity for continuing the servo-control.

3 Claims, 30 Drawing Sheets

FIG.4
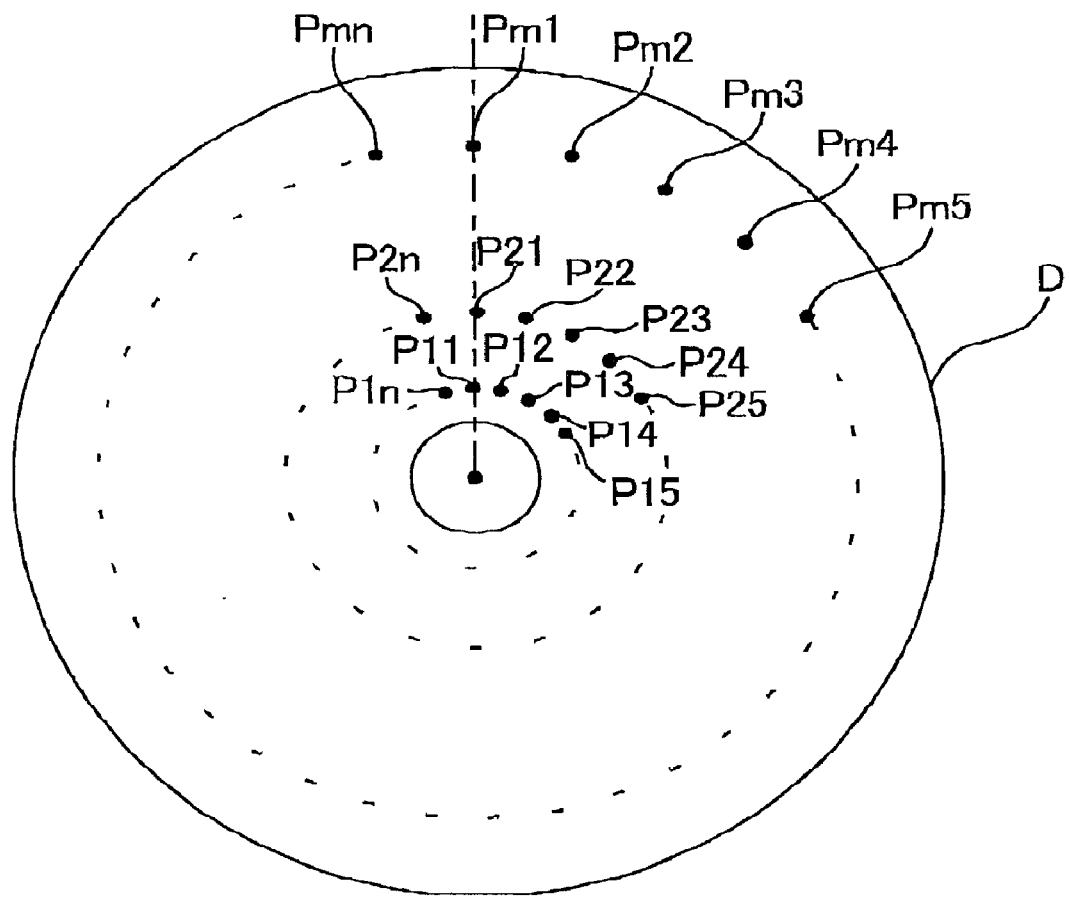
FIG.5
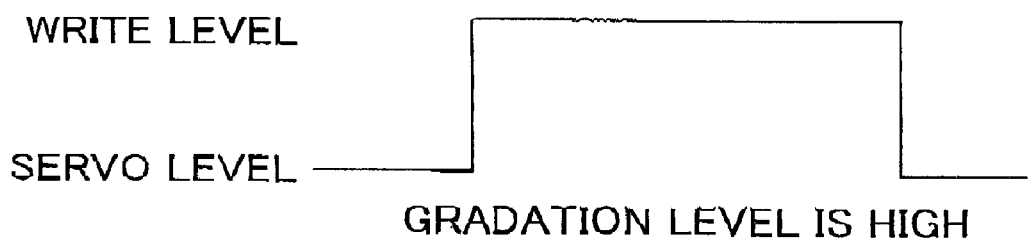
GRADATION LEVEL IS HIGH
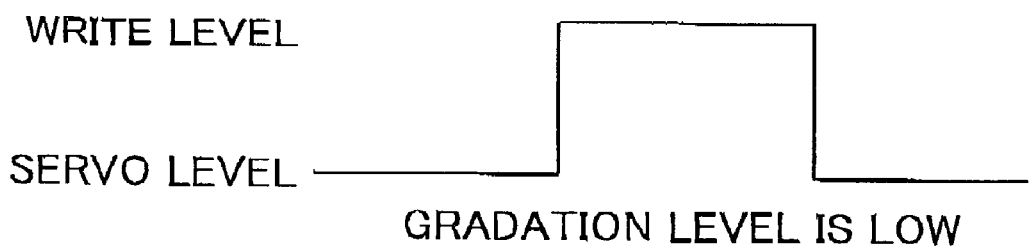
GRADATION LEVEL IS LOW

INSERTION OF SERVO OFF-PULSE

INSERTION OF SERVO ON-PULSE

FIG.14
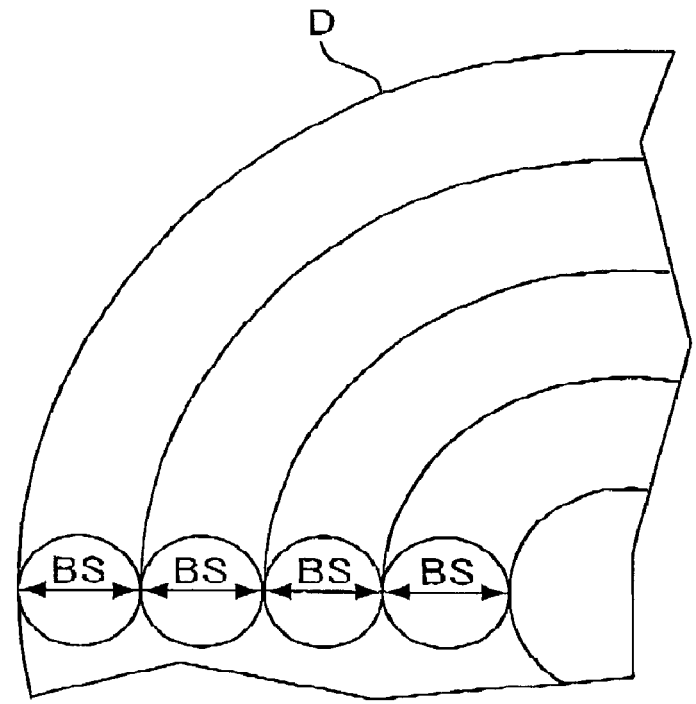
SPOT DIAMETER IS GREAT
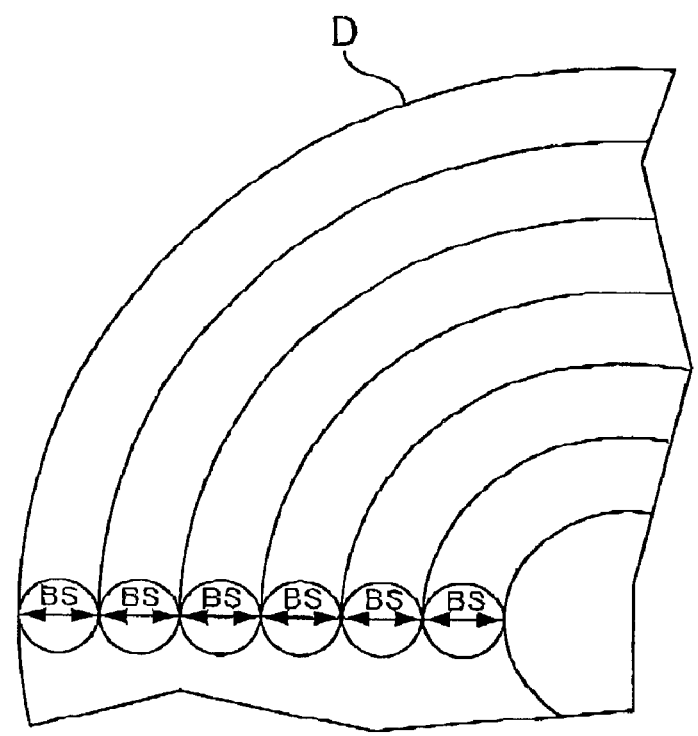
SPOT DIAMETER IS SMALL

FIG.21
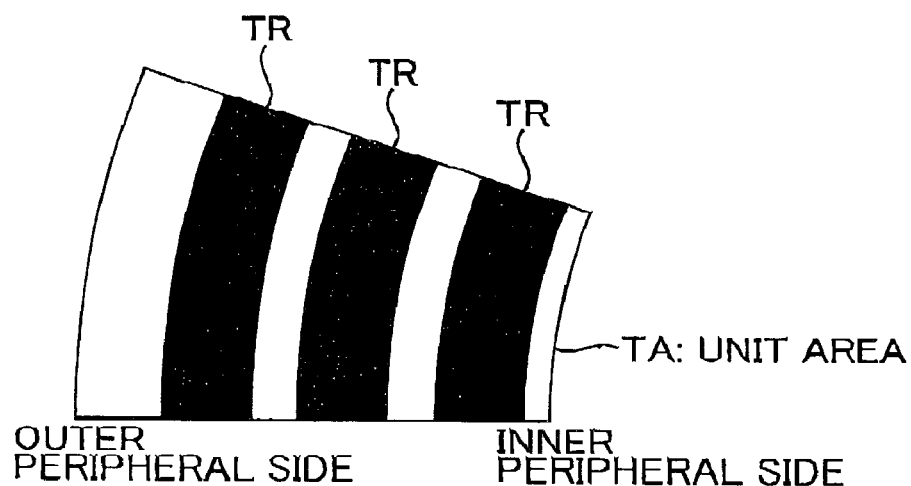
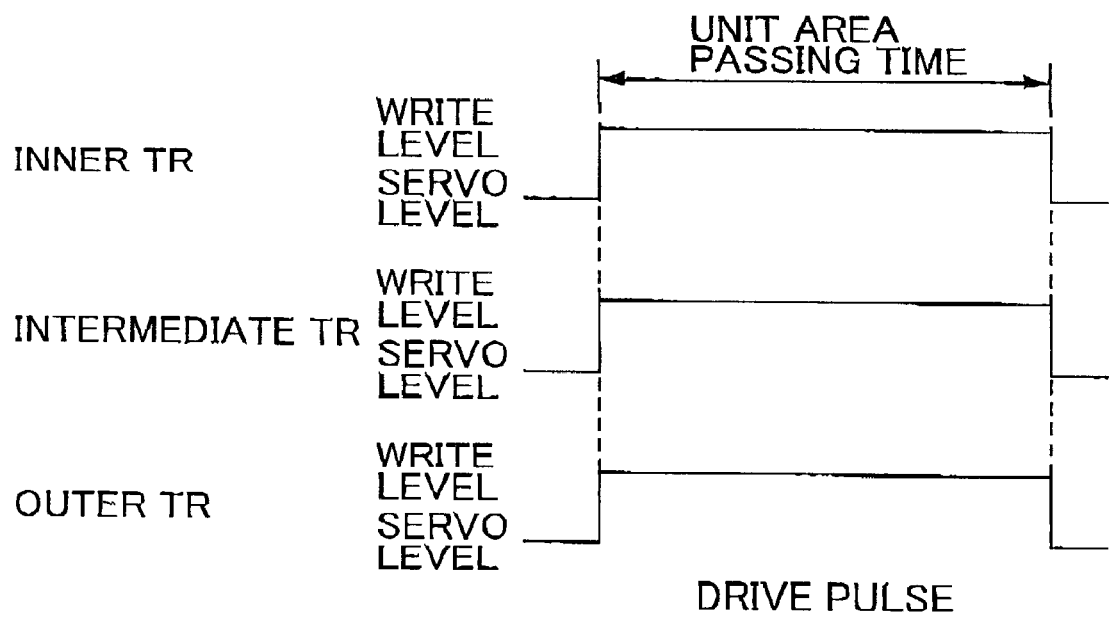

FIG.22
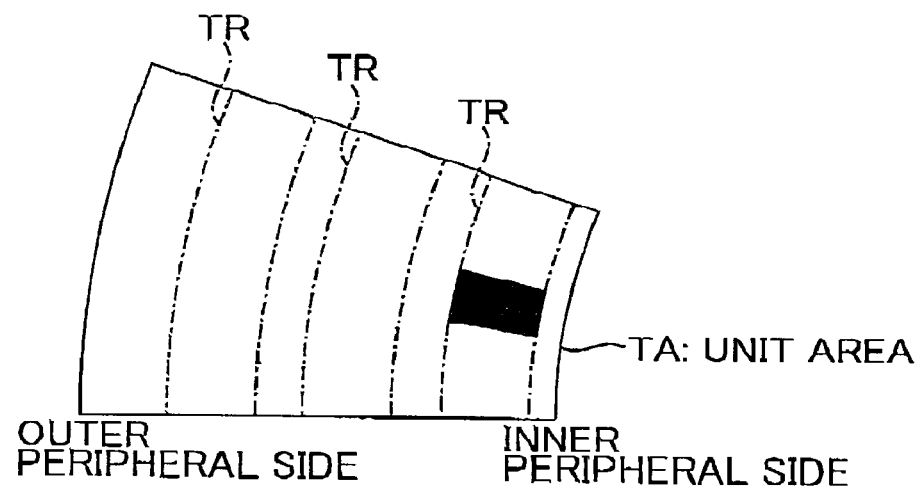
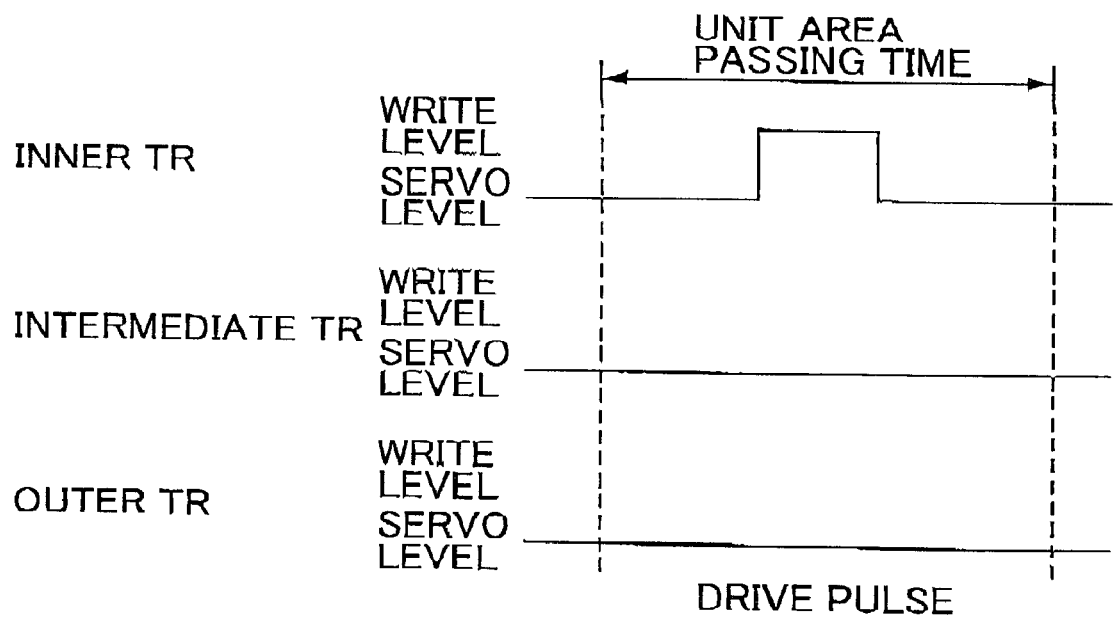

FIG.23
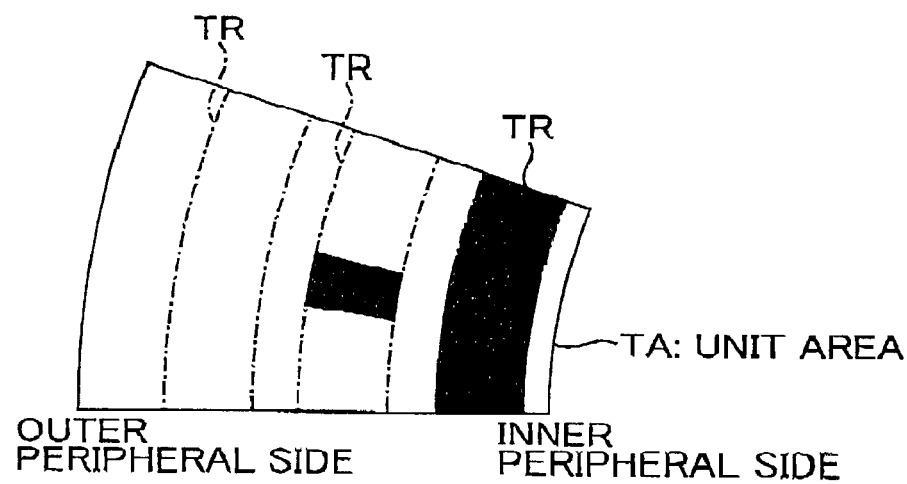
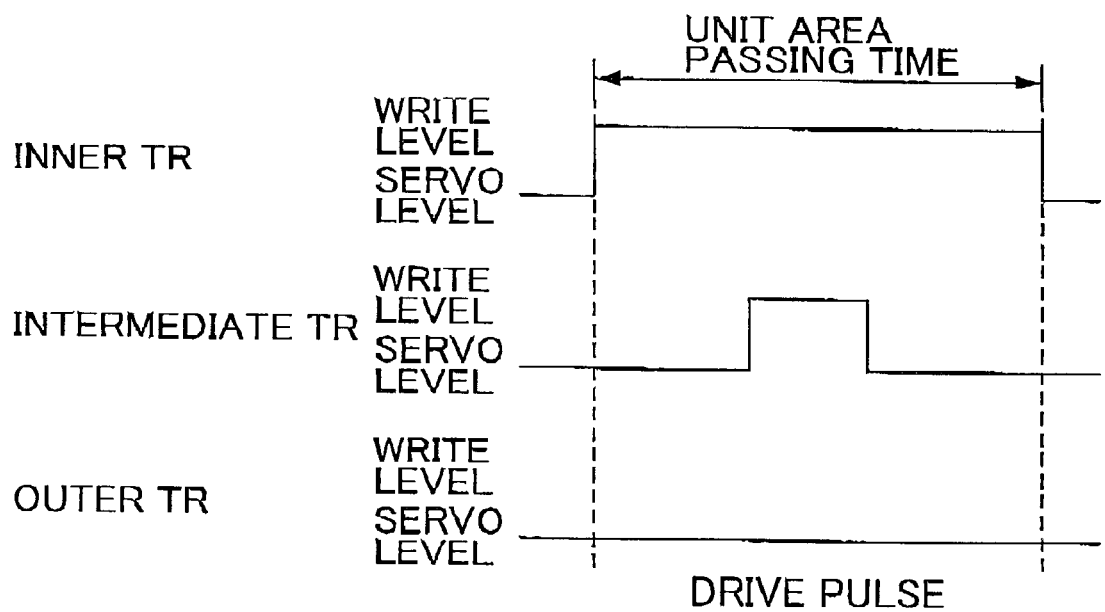

FIG.25
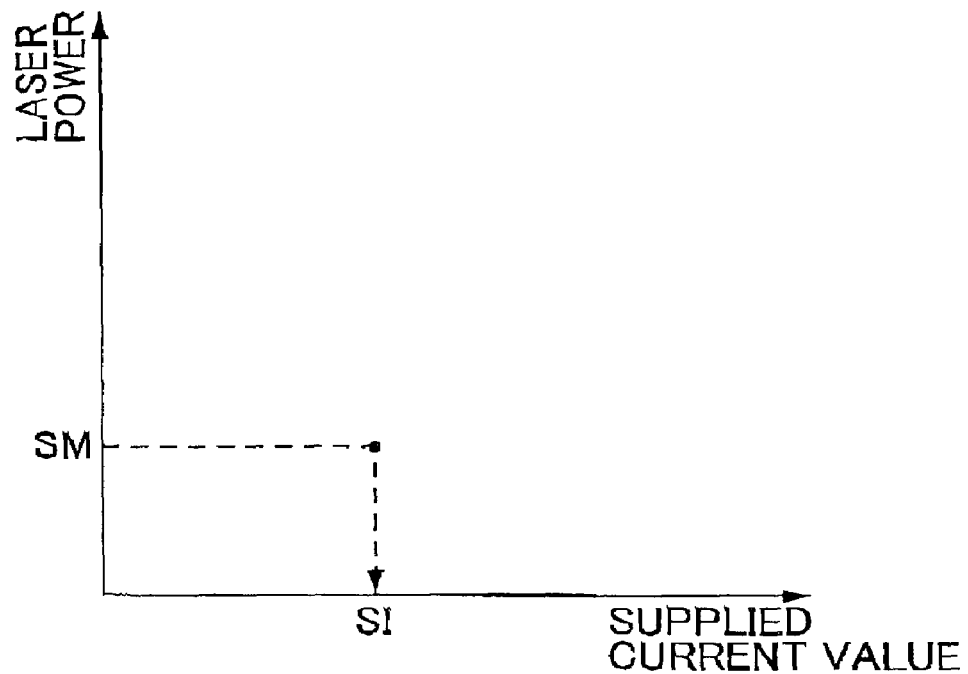
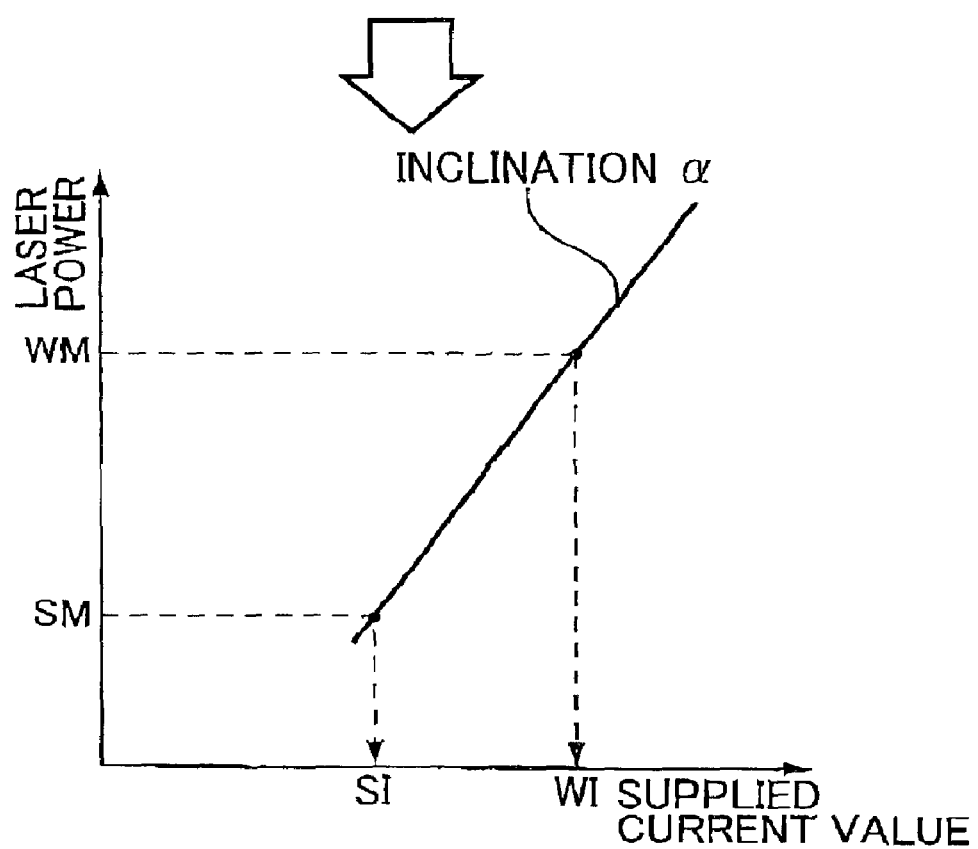

FIG. 30
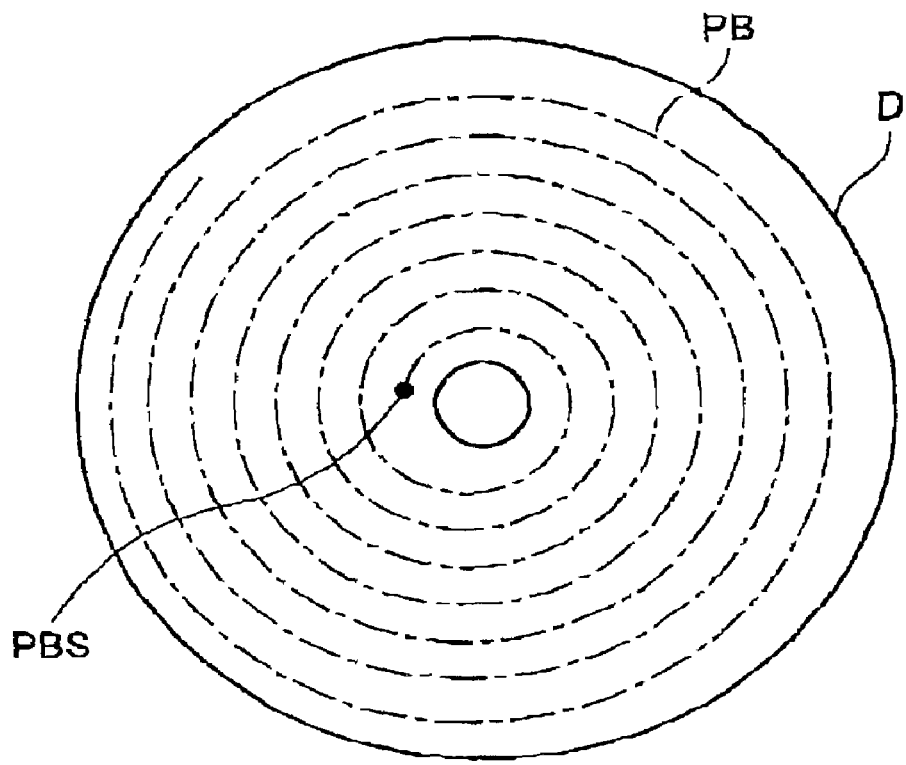
PREGROOVE VIEWED FROM RECORDING FACE
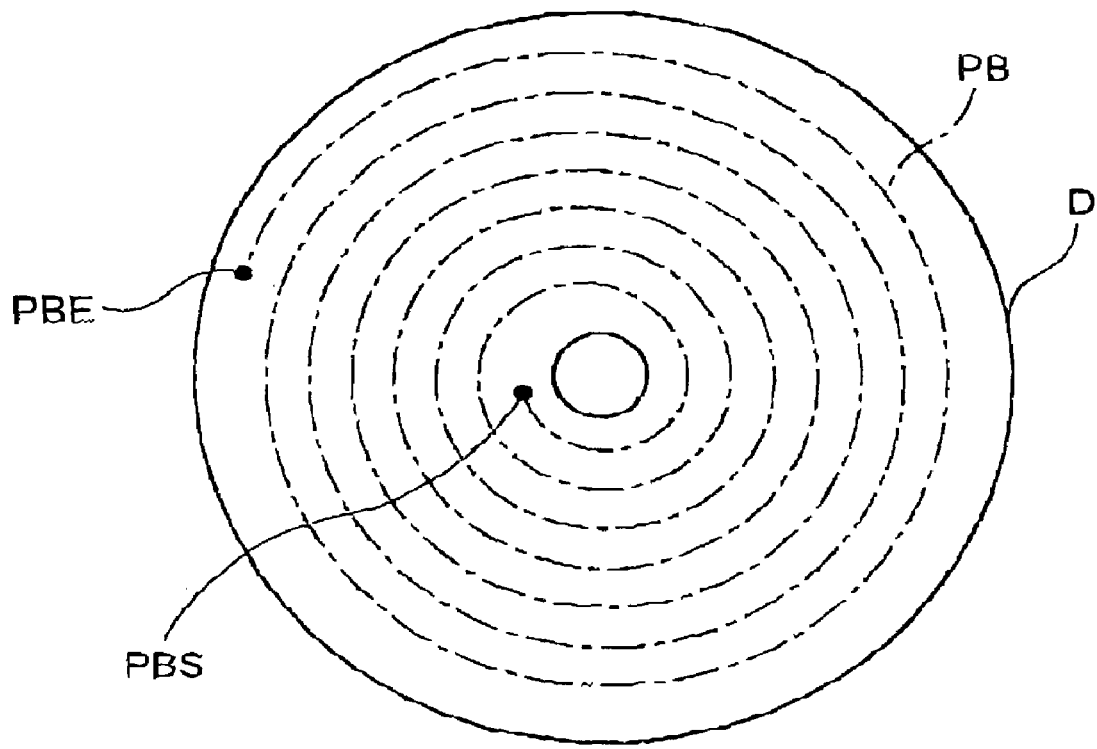
PREGROOVE VIEWED FROM THERMOSENSITIVE FACE

OPTICAL RECORDING APPARATUS WITH DRAWING CAPABILITY OF VISIBLE IMAGE ON DISK FACE

BACKGROUND OF THE INVENTION

1. Field of the Invention

The present invention relates to an optical disk recording apparatus that can form a visual image on the face of an optical disk.

2. Description of Prior Art

Recordable optical disks, such as a CD-R (Compact Disk-Recordable) and a CD-RW, are available on the market. To record a variety of data, such as music data, on these optical disks, optical disk recording apparatuses, such as CD-R drives and CD-RW drives, are employed. For recording information, one of these optical disk recording apparatuses emits a laser beam, which is modulated to correspond to the information that is to be recorded and which impinges on the recording face of an optical disk.

For some types of optical disks, printed labels for the visual presentation of content information, such as titles and brief descriptions of recorded music or other recorded data, are affixed to the other disk face opposite to the data recording side. During the process performed to produce these optical disks, a printer is used to print titles or other information on a circular label sheet, for example, and this sheet is then guided to and secured to the appropriate disk face.

However, as is described above, the printer is required during the production of an optical disk whereon desired content information such as the title of data is visually presented. Therefore, after data has been recorded to the recording face of a specific disk using an optical disk recording apparatus, complicated handling must be performed after the optical disk is ejected from the optical disk recording apparatus. Namely, a separately printed label sheet prepared using a printer is affixed to the optical disk.

SUMMARY OF THE INVENTION

To resolve this problem, it is one objective of the present invention to provide an optical disk recording apparatus that can not only record data on the recording face of an optical disk, but can also draw an image to a thermo sensitive face of the disk for the visual representation of content information without a new apparatus having to be separately prepared.

To achieve this objective, an optical disk recording apparatus according to the present invention is designed for recording information by irradiating a laser beam onto a recordable face of an optical disk, and comprises: a pickup that is provided for irradiating the laser beam on the recordable face of the optical disk; a scanning section that is provided for scanning the laser beam relative to the recordable face of the optical disk; a recording control section that is provided for controlling the pickup and the scanning section to effect recording of information on the recordable face by irradiating and scanning the laser beam; a drawing control section that is provided for controlling the pickup and the scanning section to effect drawing of a visible image on the recordable face of the optical disk according to image information, such that the laser beam irradiated onto the recordable face is changed between a first intensity incapable of acting on the recordable face of the optical disk and a second intensity capable of acting on the recordable face of the optical disk; and a servo section that periodically detects the laser beam reflected back from the recordable face of the optical disk when the laser beam has the first intensity, and that servo-controls the irradiating of the laser beam during the drawing of the visible image based on the detection of the laser beam, wherein the drawing control section controls the pickup for forcibly changing the laser beam to the first intensity from the second intensity when the second intensity is maintained over a predetermined period pursuant to the image information, thereby enabling the servo section to detect the laser beam having the first intensity for continuing the servo-control.

Preferably, the drawing control section controls the pickup for forcibly changing the laser beam to the second intensity from the first intensity when the first intensity is maintained over a predetermined period pursuant to the image information, thereby enabling the servo section to detect the laser beam having the second intensity for additionally executing the servo-control of the laser beam.

Preferably, the servo section controls the pickup to regulate the second intensity of the laser beam based on the detection of the laser beam having the first intensity.

With this arrangement, when in accordance with image information the recordable face of the optical disk is irradiated by the laser beam, the visual image corresponding to the image information can be formed by discoloring the recordable face. For this visual image forming process, when in accordance with the image information the laser beam has been emitted for a long time at the second intensity, whereat the recordable face is visually changed, regardless of the image information, the laser beam is adjusted and is emitted at the first intensity, whereat the recordable face is substantially unchanged. Thus, the laser beam is controlled based on the irradiation results.

According to another aspect of the present invention, an optical disk recording apparatus is designed for recording information by irradiating a laser beam onto an optical disk, and comprises: a pickup that is provided for irradiating the laser beam on the optical disk having an optically recordable side and a thermally sensitive side opposite to the optically recordable side: a scanning section that is provided for scanning the laser beam relative to the optical disk; a recording control section operative when the optical disk is set to expose the optically recordable side for controlling the pickup and the scanning section to effect recording of information on the optically recordable side by irradiating and scanning the laser beam; a drawing control section operative when the optical disk is set to expose the thermally sensitive side for controlling the pickup and the scanning section to effect drawing of a visible image on the thermally sensitive side according to image information, such that the laser beam irradiated onto the thermally sensitive side is changed between a first intensity thermally incapable of acting on the thermally sensitive side of the optical disk and a second intensity thermally capable of acting on the thermally sensitive side of the optical disk; and a servo section that periodically detects the laser beam reflected back from the optical disk when the laser beam has the first intensity, and that servo-controls the irradiating of the laser beam during the drawing of the visible image based on the detection of the laser beam, wherein the drawing control section controls the pickup for forcibly changing the laser beam to the first intensity from the second intensity when the second intensity is maintained over a predetermined period pursuant to the image information, thereby enabling the servo section to detect the laser beam having the first intensity for continuing the servo-control.

Preferably, the drawing control section controls the pickup for forcibly changing the laser beam to the second intensity from the first intensity when the first intensity is maintained over a predetermined period pursuant to the image information, thereby enabling the servo section to detect the laser beam having the second intensity for additionally executing the servo-control of the laser beam.

Preferably, the servo section controls the pickup to regulate the second intensity of the laser beam based on the detection of the laser beam having the first intensity.

With this arrangement, when in accordance with image information the thermo sensitive face of the optical disk is irradiated by the laser beam, a visual image corresponding to the image information can be formed by discoloring the thermo sensitive face. For this visual image forming process, when in accordance with the image information the laser beam has been emitted for a long time at the second intensity, whereat the thermo sensitive face is changed, regardless of the image information, the laser beam is adjusted and emitted at the first intensity, whereat the thermo sensitive face is substantially unchanged. Thus, the laser beam is controlled based on the irradiation results.

According to an additional aspect of the present invention, an optical disk recording apparatus is designed for recording information by irradiating a laser beam onto an optical disk, and comprises: a pickup that is provided for irradiating the laser beam to form a beam spot on the optical disk having an optically recordable side and a thermally sensitive side opposite to the optically recordable side; a scanning section that is provided for scanning the beam spot relative to the optical disk; a recording control section operative when the optical disk is set to expose the optically recordable side for controlling the pickup and the scanning section to effect recording of information on the optically recordable side by irradiating and scanning the laser beam; a drawing control section operative when the optical disk is set to expose the thermally sensitive side for controlling the pickup and the scanning section to effect drawing of a visible image on the thermally sensitive side by irradiating and scanning the laser beam; and a beam spot control section that controls a size of the beam spot greater in the drawing of the visible image than another size of the beam spot used in the recording of the information.

Preferably, the beam spot control section comprises a focus servo that operates during the recording of the information for detecting a signal of the laser beam reflected back from the optically recordable side of the optical disk so as to servo-control focusing of the laser beam relative to the optically recordable side based on the detected signal, the focus servo being utilized during the drawing of the visible image for servo-controlling the size of the beam spot according to a signal detected from the laser beam reflected back from the thermally sensitive side of the optical disk.

Preferably, the beam spot control section operates during the drawing of the visible image for controlling the size of the beam spot according to the laser beam reflected back from the thermally sensitive side of the optical disk.

With this arrangement, when in accordance with image information the thermo sensitive face of the optical disk is irradiated by the laser beam, a visual image corresponding to the image information can be formed by discoloring the thermo sensitive face. For the visual image forming process, the apparatus increases the diameter of the beam spot of the laser beam that is emitted for the thermo sensitive face of the optical disk. Accordingly, during each revolution of the optical disk, the laser beam can cover a larger area, and the time required to form a visual image can be reduced.

According to a further aspect of the present invention, an optical disk recording apparatus is designed for recording information by irradiating a laser beam onto an optical disk, and comprises: a pickup that is provided for irradiating the laser beam on the optical disk having an optically recordable side and a thermally sensitive side opposite to the optically recordable side; a scanning section that is provided for scanning the laser beam over the optical disk; a recording control section operative when the optical disk is set to face the optically recordable side to the pickup for controlling the pickup and the scanning section to effect recording of information on the optically recordable side by irradiating and scanning the laser beam; a drawing control section operative when the optical disk is set to face the thermally sensitive side to the pickup for controlling the pickup and the scanning section to effect drawing of a visible image on the thermally sensitive side by irradiating and scanning the laser beam; and a gap adjusting section that adjusts a gap between the pickup and the optical disk depending on whether the optical disk is set to face the optically recordable side or the thermally sensitive side to the pickup, thereby respectively optimizing the recording of the information and the drawing of the visible image.

Preferably, the gap adjusting section displaces the optical disk relative to the pickup when the thermally sensitive side faces the pickup, from a position where the optical disk is set to face the optically recordable side to the pickup.

Otherwise, the gap adjusting section displaces the pickup relative to the optical disk when the thermally sensitive side faces the pickup, from a position where the pickup is set to face the optically recordable side of the optical disk With this arrangement, when in accordance with image information the thermo sensitive race of the optical disk is irradiated by the laser beam, a visual image corresponding to the image information can be formed by discoloring the thermo sensitive face. After the optical disk has been set up, whether the thermo sensitive face or the recording face is positioned opposite the optical pickup is ascertained, and the results are employed to adjust the positional relationship between the optical pickup and the opposite race. Therefore, even though the distance between the optical pickup and the opposite face varies when the recording face is positioned reversely to the optical pickup and when the thermo sensitive face is positioned opposite the optical pickup, a variance in distance problem, which may impair various types of controls such as focus control from being performed, can be avoided.

According to a still further aspect of the present invention, an optical disk recording apparatus is designed for recording information by irradiating a laser beam onto an optical disk, and comprises: a pickup that is provided for irradiating the laser beam onto the optical disk having an optically recordable side formed with a guide groove in a circumferential direction of the optical disk and a thermally sensitive side opposite to the optically recordable side; a scanning section that is provided for scanning the laser beam over the optical disk; a recording control section operative when the optical disk is set such as to face the optically recordable side to the pickup for controlling the pickup and the scanning section to effect recording of information on the optically recordable side by irradiating and scanning the laser beam; a servo section operative when the optical disk is set to face the thermally sensitive side to the pickup for servo-controlling the scanning section to enable the laser beam to track the guide groove according to the laser beam reflected back from the thermally sensitive side of the optical disk; and a drawing control section operative when the thermally sensitive side of the optical disk faces the pickup for controlling the pickup to effect drawing of a visible image on the thermally sensitive side by irradiating the laser beam while the laser beam tracks the guide groove.

Preferably, the scanning section comprises a rotary driver for rotating the optical disk and a radial feeder for feeding the pickup radially of the rotated optical disk to thereby scan the laser beam over the optical disk, the rotary driver being operative during the drawing of the visible image for rotating the optical disk in a direction reversely of the recording of the information.

Preferably, the servo section operates during the recording of the information onto the optically recordable side for controlling the scanning section to enable the laser beam to track the guide groove from an inner central portion of the optical disk to an outer peripheral portion of the optical disk, and the servo section operates during the drawing of the visible image onto the thermally sensitive side for controlling the scanning section to enable the laser beam to track the guide groove from the outer peripheral portion of the optical disk to the inner central portion of the optical disk.

With this arrangement, when in accordance with the image information the thermo sensitive face of the optical disk is irradiated by the laser beam, the thermo sensitive face can be discolored and a visual image corresponding to the image information can be formed thereon. At this time, while forming the visual image, there is no need to employ the laser irradiation position control process, which is more complicated than when information is recorded to the recording face, wherein a guide groove formed in the recording face is detected and the radiation spot position of the laser is moved along the detected guide groove.

According to one more aspect of the present invention, an optical disk recording apparatus is designed for recording information by irradiating a laser beam onto an optical disk, and comprises: a pickup that is provided for irradiating the laser beam onto the optical disk having an optically recordable side and a thermally sensitive side opposite to the optically recordable side; a rotary driving section that is provided for rotating the optical disk at a given rotation speed; a clock generating section that generates a clock signal having a frequency proportional to the rotation speed of the optical disk; a recording control section operative when the optical disk is set such as to face the optically recordable side to the pickup for controlling the pickup to effect recording of information on the optically recordable side by irradiating the laser beam; a drawing control section operative when the optical disk is set such as to face the thermally sensitive side to the pickup for controlling the pickup to effect drawing of a visible image on the thermally sensitive side by irradiating the laser beam according to given image information such that the laser beam is modulated each period of the clock signal; a rotation detection section that detects each time the optical disk is rotated one round during the drawing of the visible image; and a scanning section operative when the optical disk is detected to rotate one round for advancing the laser beam by one step interval radially of the rotated optical disk to thereby scan the laser beam over the optical disk during the drawing of the visible image on the thermally sensitive side.

Preferably, the drawing control section operates each time the optical disk is detected to rotate one round for controlling the pickup to irradiate the laser beam to effect the drawing of the visible image during one round, and controlling the pickup to suspend irradiating of the laser beam during next one round so as to prepare for the drawing of the visible image.

Preferably, the scanning section comprises a radial feeder for feeding the pickup radially of the optical disk with a given resolution, and a tracking servo for servo-controlling a position of the laser beam along a track of the optical disk, such that the scanning section operates if the step interval is set smaller than the resolution of the radial feeder for utilizing the tracking servo to advance the laser beam by the step interval radially of the rotated optical disk.

With this arrangement, when in accordance with the image information the thermo sensitive face of the optical disk is irradiated by the laser beam, the thermo sensitive face can be discolored and a visual image corresponding to the image information can be formed thereon. For the visual image forming process, the irradiation of the optical disk by a laser beam for forming a visual image is controlled and performed each clock signal cycle at a frequency corresponding to the speed at which the optical disk is rotated, i.e., for each angular interval of the optical disk at a predetermined angle. Therefore, a visual image corresponding to the image information (e.g., having a corresponding density) can be formed at a position correlated with each predetermined angle of the optical disk.

According to yet another aspect of the present invention, an optical disk recording apparatus is designed for recording information by irradiating a laser beam onto an optical disk, and comprises: a pickup that is provided for irradiating the laser beam onto the optical disk having an optically recordable side and a thermally sensitive side opposite to the optically recordable side; a rotary driving section that is provided for rotating the optical disk; a rotation detection section that detects each time the optical disk is rotated one round from a radial reference position of the optical disk; a recording control section operative when the optical disk is set such as to face the optically recordable side to the pickup for controlling the pickup to effect recording of information on the optically recordable side by irradiating the laser beam; a drawing control section operative when the optical disk is set such as to face the thermally sensitive side to the pickup for controlling the pickup to effect drawing of a visible image on the thermally sensitive side by irradiating the laser beam according to given image information; and a scanning section operative when the optical disk is detected to rotate one round for advancing the laser beam by one step interval radially of the rotated optical disk to thereby scan the laser beam over the optical disk during the drawing of the visible image on the thermally sensitive side, wherein the drawing control section operates when the optical disk is detected to rotate one round for activating the pickup to irradiate the laser beam so as to start the drawing of the visible image from the radial reference position of the optical disk, and then operates when the laser beam approaches to the radial reference position for inactivating the pickup to stop the drawing of the visible image before the laser beam reaches the radial reference position of the optical disk.

With this arrangement, when in accordance with the image information the thermo sensitive face of the optical disk is irradiated by the laser beam, the thermo sensitive face can be discolored and a visual image corresponding to the image information can be formed thereon. For the visual image forming process, as the optical disk is rotated, starting at the reference position of the optical disk the laser beam is emitted to form the visual image, while the laser beam for forming a visual image is not emitted to irradiate an area located immediately before the already irradiated position when the laser beam returns to the reference position. Therefore, even when for a specific reason such as the unstable rotation of an optical disk, laser irradiation control is disturbed and the optical disk is rotated while the laser beam is emitted at the reference position, and when the irradiation position again passes through the reference position, i.e., the laser irradiation position is later moved so that it overlaps a position that has already been irradiated by the laser beam, the irradiation performed by the laser beam to form the visual image can be prevented at the pertinent position, and as a result, deterioration of the quality of the visual image can be prevented.

According to yet one more aspect of the present invention, an optical disk recording apparatus is designed for recording information by irradiating a laser beam onto an optical disk of various types, and comprises: a pickup that is provided for irradiating the laser beam on the optical disk having an optically recordable side and a thermally sensitive side opposite to the optically recordable side; a scanning section that is provided for scanning the laser beam relative to the optical disk; a recording control section operative when the optical disk is set to expose the optically recordable side for controlling the pickup and the scanning section to effect recording of information on the optically recordable side by irradiating and scanning the laser beam; a disk detecting section that is provided for acquiring identification information from the optical disk to identify the type of the optical disk set in the apparatus; and a drawing control section operative when the optical disk is set to expose the thermally sensitive side for controlling the pickup and the scanning section in accordance with the identified type of the optical disk so as to effect drawing of a visible image on the thermally sensitive side by irradiating and scanning the laser beam.

Preferably, the disk detecting section acquires the identification information prerecorded on the thermally sensitive side of the optical disk.

Preferably, the disk detecting section acquires the identification information prerecorded on the optically recordable side of the optical disk.

With this arrangement, when in accordance with the image information the thermo sensitive face of the optical disk is irradiated by the laser beam, the thermo sensitive face can be discolored and a visual image corresponding to the image information can be formed thereon. At that time, the visual image forming process can be performed in accordance with the type of the disk that is set up.

According to yet additional aspect of the present invention, an optical disk recording apparatus is designed for recording information by irradiating a laser beam onto an optical disk, and comprises: a pickup that is provided for irradiating the laser beam on the optical disk having an optically recordable side and a thermally sensitive side opposite to the optically recordable side; an encoding section that is provided for encoding the information to be recorded; a recording control section operative when the optical disk is set to expose the optically recordable side for controlling the pickup to irradiate the laser beam according to the information encoded by the encoding section to thereby effect recording of the information in an encoded form on the optically recordable side; a drawing control section operative when the optical disk is set to expose the thermally sensitive side for controlling the pickup to irradiate the laser beam according to image information so as to effect drawing of a visible image on the thermally sensitive side; and a blocking section operative during the drawing of the visible image for blocking the encoding section from encoding the image information such that the visible image is drawn according to a non-encoded form of the image information.

With this arrangement, when in accordance with the image information the thermo sensitive race or the optical disk is irradiated by the laser beam, the thermo sensitive face can be discolored and a visual image corresponding to the image information can be formed thereon. For this visual image forming process, since the operation of the encoding means is inhibited and the data recorded to the thermo sensitive face is not encoded, namely, the image information is not encoded. Therefore, a special data transmission structure is not required to form a visual image corresponding to the image information, and the data transmission structure used for recording information on the recording face can be employed to form a visual image.

According to yet a further aspect of the present invention, an optical disk recording apparatus is designed for recording information by irradiating a laser beam onto an optical disk, and comprises: a pickup that is provided for irradiating the laser beam on the optical disk having an optically recordable side and a thermally sensitive side opposite to the optically recordable side; a recording control section operative when the optical disk is set to expose the optically recordable side for controlling the pickup to irradiate the laser beam according to the information to thereby effect recording of the information; and a drawing control section operative when the optical disk is set to expose the thermally sensitive side for controlling the pickup to irradiate the laser beam according to image information so as to effect drawing or a visible image on the thermally sensitive side, such that the laser beam is controlled according to gradation indicated by the image information so as to gradate the visible image drawn on the thermally sensitive side of the optical disk.

With this arrangement, when in accordance with the image information the thermo sensitive face of the optical disk is irradiated by the laser beam, the thermo sensitive face can be discolored and a visual image corresponding to the image information can be formed thereon. For the visual image forming process, the laser beam can be controlled in accordance with the gradation level at each position (each coordinate location) on the thermo sensitive face indicated in the image information, and a visual image can be formed where the gradation is expressed.

According to still another aspect of the present invention, an image forming method employs an optical disk recording apparatus having an optical pickup which irradiates a laser beam onto a recordable face of an optical disk to record information, and forms a visual image according to image data on a thermo sensitive face of said optical disk which is opposite to said recordable face. The inventive method comprises the steps of: controlling said laser beam emitted by said optical pickup, so that a visual image corresponding to the image data is formed by said optical pickup on said thermo sensitive race of said optical disk, while an irradiation position of said laser beam emitted by said optical pickup is moved along a predetermined spiral or concentric path on said thermo sensitive face; defining unit areas by radially dividing the thermo sensitive face such that each unit area has a sector shape containing a predetermined number of segments of the spiral or concentric path; and controlling an irradiation timing of said laser beam onto the respective segments of the spiral or concentric path that belong to each unit area, so that an optical density of each unit area is controlled to express gradation of said visual image.

According to this method, when the laser beam is emitted in accordance with the image information to irradiate the thermo sensitive face of the optical disk, the thermo sensitive face is discolored and a visual image can be formed in accordance with the image information. For this visual image forming process, the laser irradiation timing control can be performed in accordance with the gradation level of each position (each coordinate location) on the thermo sensitive face indicated in the image information, and a visual image can be obtained where the gradation is expressed.

BRIEF DESCRIPTION OF THE DRAWINGS

FIG. 4 is a diagram for explaining the contents of image information that the optical disk recording apparatus employs to form a visual image on the thermo sensitive face of the optical disk.

FIG. 5 is a diagram for explaining the laser irradiation control processing performed for expressing the gradation of an image when the optical disk recording apparatus forms a visual image on the thermo sensitive face of the optical disk.

FIG. 14 is a diagram for explaining the size of the beam spot of a laser beam that the optical pickup of the optical disk recording apparatus emits for the thermo sensitive face of the optical disk.

FIG. 21 is a diagram for explaining a method whereby the optical disk recording apparatus expresses the density of a visual image that is formed on the thermo sensitive face of the optical disk.

FIG. 22 is a diagram for explaining a method whereby the optical disk recording apparatus expresses the density of a visual image that is formed on the thermo sensitive face of the optical disk.

FIG. 23 is a diagram for explaining a method whereby the optical disk recording apparatus expresses the density of a visual image that is formed on the thermo sensitive face of the optical disk.

FIG. 25 is a diagram for explaining details of the laser power control exercised by the optical disk recording apparatus.

FIG. 30 is a diagram for explaining the visual image formation method for moving the laser irradiation position along a pregroove that is formed in the recording face on the reverse side of the thermo sensitive face of the optical disk.

DETAILED DESCRIPTION OF THE INVENTION

EMBODIMENTS

Figure 1:
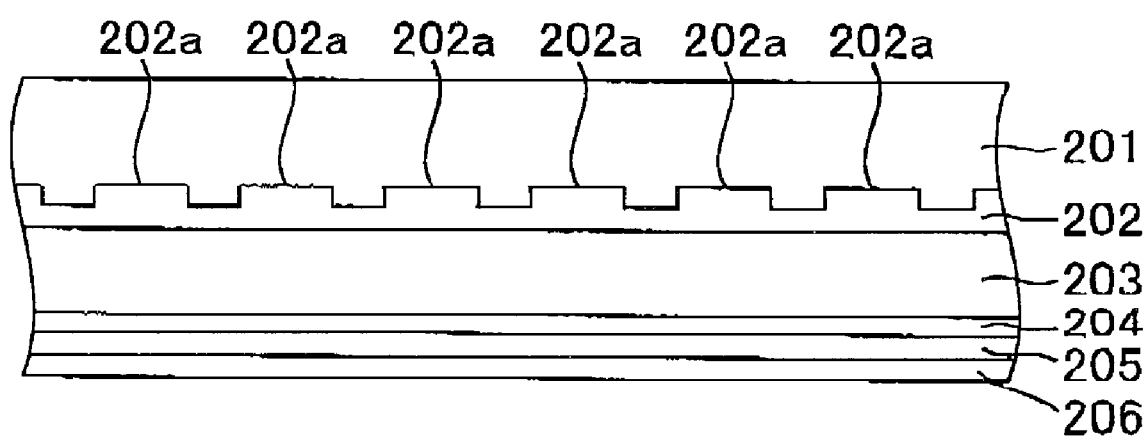
FIG. 1 is a schematic cross-sectional view of the structure of an optical disk on which a visual image can be formed by an optical disk recording apparatus according to one embodiment of the present invention.

Embodiments of the present invention will now be described while referring to the drawings.

A. Configuration of the Embodiment

The present invention relates to an optical disk recording apparatus that emits a laser beam to irradiate the recording face of an optical disk. The optical disk recording apparatus has a function not only for recording information to the recording face, but also for emitting the laser beam to irradiate the thermo sensitive face of the optical disk on the side opposite that of the recording face, and forming a visual image corresponding to the image information. First, an explanation will be given for the configuration of an optical disk on which the visual image can be formed, and then, the configuration of an optical disk recording apparatus that can record information to the optical disk as well as form a visual image.

A-1. Configuration of an Optical Disk

First, FIG. 1 is a cross-sectional side view of the structure of an optical disk, on one of the faces of which information can be recorded and on the other face of which a visible image can be formed. As is shown in FIG. 1, an optical disk D includes a protective layer 201, a recording layer (recording face) 202, a reflective layer 203, a protective layer 204, a photosensitive layer (thermo sensitive face) 205 and a protective layer 206, which are laminated in the named order. It should be noted that a specific structure of the optical disk D is shown in FIG. 1, and the ratios of the sizes of the individual layers is not limited to that which is shown in FIG. 1.

A spiral pregroove (guide groove) 202a is formed in the recording layer 202, and to record information to the optical disk D, a laser beam is emitted along this pregroove 202a. Therefore, for recording information, the optical disk D is set up so that the face (hereinafter referred to as a recording face) nearest the protective layer 201 (the upper side in FIG. 1) is directed toward the optical pickup of the optical disk recording apparatus, and the laser beam emitted by the optical pickup is moved along the pregroove 202a. According to the present invention, to form a visual image on the race of the optical disk D, the optical disk D is set up so that the face (hereinafter referred to as a thermo sensitive face) nearest the protective layer 206 is directed toward the optical pickup of the optical disk recording apparatus. Then, to form a visual image, the photosensitive layer 205 is thermally discolored by using a laser beam to irradiate desired locations. As is described above, the optical disk D has the same structure as the CD-Rs that are conventionally employed, except for the photosensitive layer 205 that is formed, and a detailed explanation of such portions of the structure as the recording layer 202, will not be given. For this specification, the "thermo sensitive face" is the face that is discolored when irradiated by the laser beam, and the material composing the photosensitive layer 205 possesses this is property.

A-2. Configuration of an Optical Disk Recording Apparatus

Figure 2:
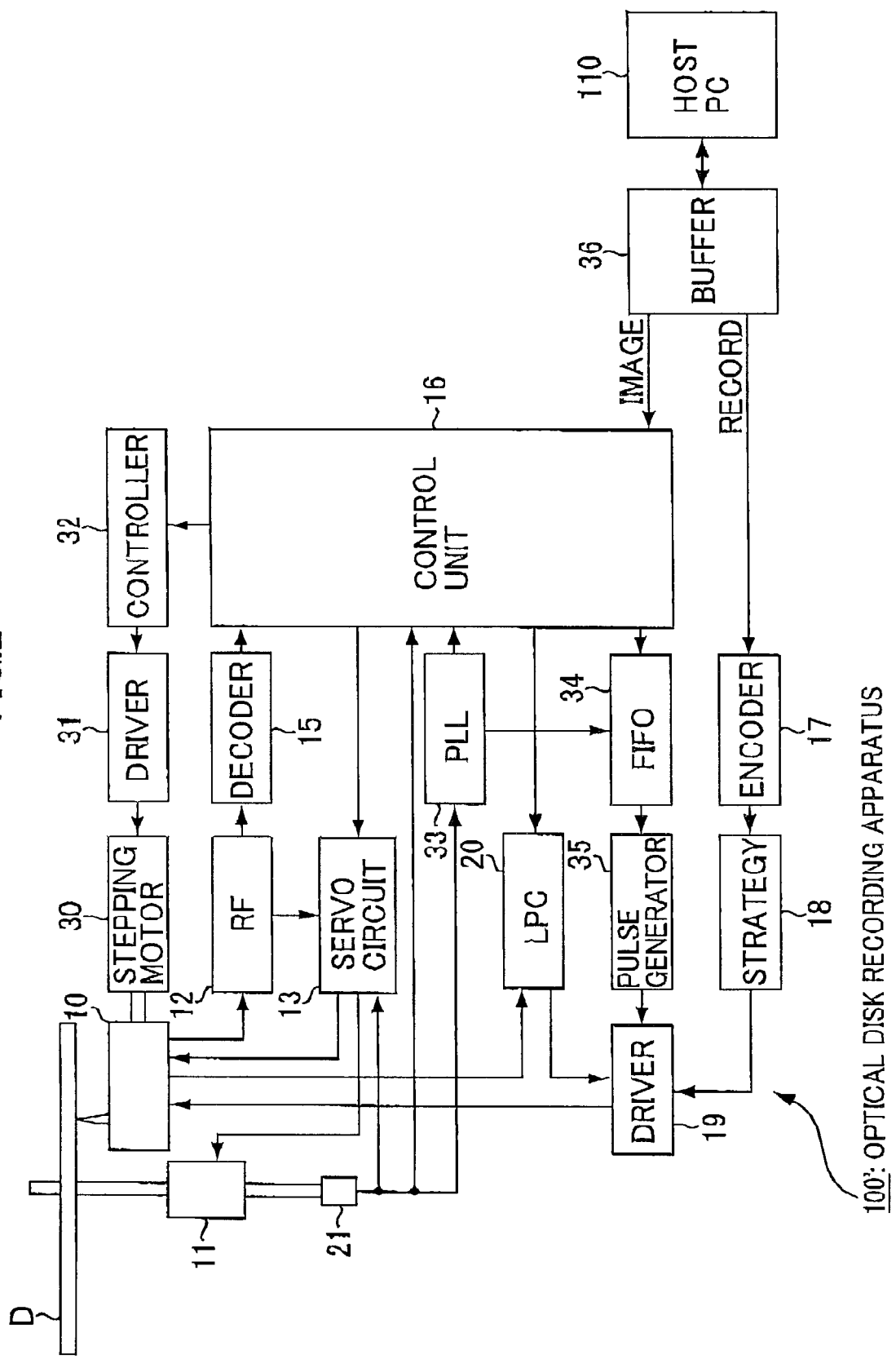
FIG. 2 is a block diagram showing the configuration of the optical disk recording apparatus according to the embodiment of the present invention.

FIG. 2 is a block diagram showing the configuration of an optical disk recording apparatus according to one embodiment of the present invention. As is shown in FIG. 2, an optical disk recording apparatus 100, which is connected to a host personal computer (PC) 110, comprises: an optical pickup 10, a spindle motor 11, an RF (Radio Frequency) amplifier 12, a servo circuit 13, a decoder 15, a control unit 16, an encoder 17, a strategy circuit 18, a laser driver 19, a laser power controller 20, a frequency generator 21, a stepping motor 30, a motor driver 31, a motor controller 32, a PLL (Phase Locked Loop) circuit 33, an FIFO (First In First out) memory 34, a drive pulse generator 35, and a buffer memory 36.

The spindle motor 11 rotates the optical disk D to which data is to be recorded, and the servo circuit 13 controls the number of times the optical disk D revolves. Since for recording the optical disk recording apparatus 100 in this embodiment employs the CAV (Constant Angular Velocity) method, the spindle motor 11 rotates at a predetermined angular velocity instructed by the control unit 16.

Figure 3:
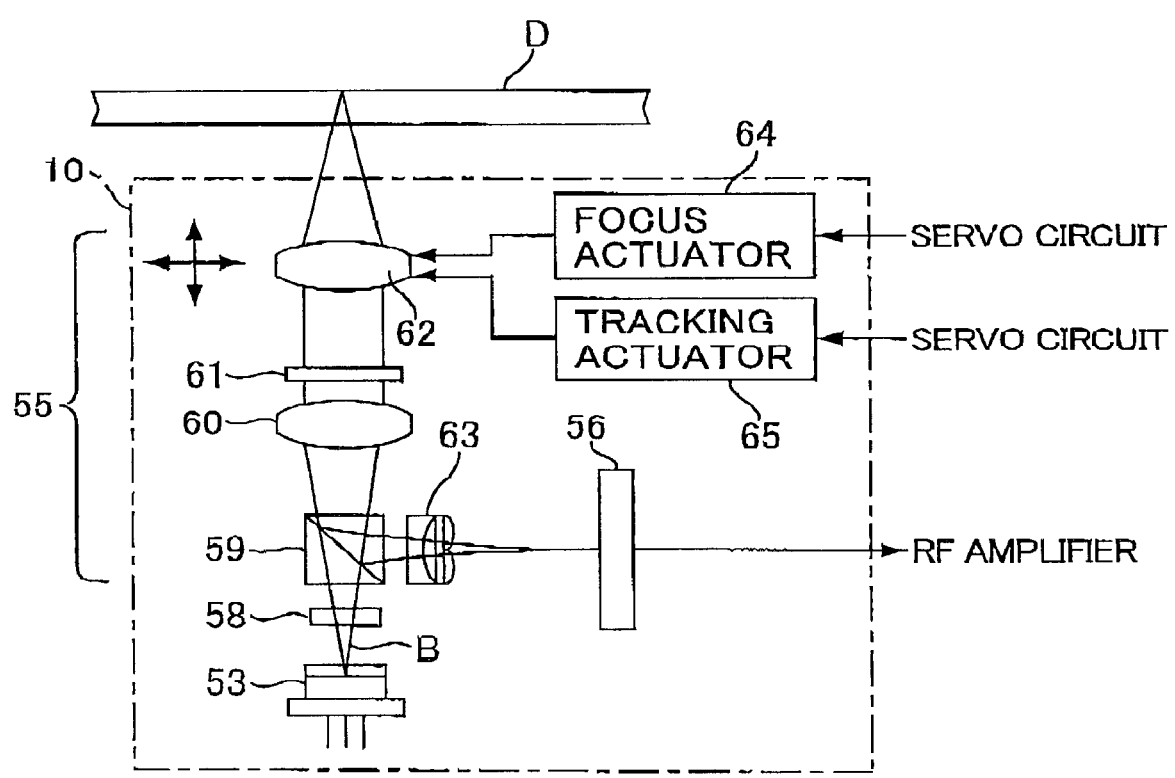
FIG. 3 is a diagram showing the arrangement of an optical pickup that is one component of the optical disk recording apparatus.

The optical pickup 10 is a unit that emits a laser beam for irradiating the optical disk D that is rotated by the spindle motor 11, and its structure is shown in FIG. 3. As is shown in FIG. 3, the optical pickup 10 includes: a laser diode 53 for emitting a laser beam B; a diffraction grating 58; an optical system 55 for condensing the laser beam B at the face of the optical disk D; and a light-receiving element 56 for receiving a reflected beam.

In the optical pickup 10, the laser diode 53 receives a drive current from the laser driver 19 (see FIG. 2), and emits the laser beam B at an intensity consonant with the drive current. In the optical pickup 10, the laser beam B emitted by the laser diode 53 is split into a primary beam, a preceding beam and a succeeding beam, and these three beams pass through a polarized beam splitter 59, a collimator lens 60, a ¼ wavelength plate 61 and an object lens 62 and are condensed at the face of the optical disk D. The three laser beams are reflected by the face of the optical disk D and again pass through the object lens 62, the ¼ wavelength plate 61 and the collimator lens 60, and are reflected by the polarized beam splitter 59. From there, the reflected beams are transmitted through a cylindrical lens 63 to the light-receiving element 56, which receives the reflected beams and outputs them as light reception signals to the RF amplifier 12 (see FIG. 2). Thereafter, the RF amplifier 12 transmits these signals to the control unit 16 and the servo circuit 13.

The object lens 62 is held by a focus actuator 64 and a tracking actuator 65 so that it can be moved in the light axial direction of the laser beam B and in the direction of the diameter of the optical disk D. In accordance with a focus error signal and a tracking error signal received from the servo circuit 13 (see FIG. 2), the focus actuator 64 and the tracking actuator 65 move the object lens 62 in the light axial direction and in the direction of the diameter of optical disk D. The servo circuit 13 generates the focus error signal and the tracking error signal based on the light reception signals transmitted by the light-receiving element 56 through the RF amplifier 12, and moves the object lens 62, in the manner described above, so that the focusing and tracking operations can be performed.

The optical pickup 10 includes a front monitor diode (not shown), and when the laser beam is emitted by the laser diode 53, the front monitor diode receives the beam and generates a current that is transmitted by the optical pickup 10 to the laser power controller 20, in FIG. 2.

The RF amplifier 12 amplifies an RF signal that is produced by EFM (Eight to Fourteen Modulation) and is received from the optical pickup 10, and outputs a resultant RF signal to the servo circuit 13 and the decoder 15. For reproduction, the decoder 15 performs EFM demodulation for the EFM modulated RF signal received from the RF amplifier 12 and generates reproduction data.

Transmitted to the servo circuit 13 is an instruction signal from the control unit 16, an FG pulse signal from the frequency generator 21 that has a frequency consonant with the number of revolutions of the spindle motor 11, and an RF signal from the RF amplifier 12. Based on these signals, the servo circuit 13 rotates the spindle motor 11, and focuses or tracks the optical pickup 10. The method used for driving the spindle motor 11 to record information to the recording face (see FIG. 1) of the optical disk D or to form a visual image on the thermo sensitive face (see FIG. 1) of the optical disk D can be either a CAV (Constant Angular Velocity) method for driving the optical disk D to obtain a predetermined angular velocity, or a CLV (Constant Linear Velocity) method for rotating the optical disk D to obtain a predetermined linear velocity for recording. The optical disk recording apparatus 100 in this embodiment employs the CAV method, and the servo circuit 13 rotates the spindle motor 11 at a predetermined angular velocity designated by the control unit 16.

Stored in the buffer memory 36 is information (hereinafter referred to as write data) to be recorded to the recording face of the optical disk D and information (hereinafter referred to as image information) corresponding to a visual image that is to be formed on the thermo sensitive face of the optical disk D. The write data stored in the buffer memory 36 are output to the encoder 17, while the image information are output to the control unit 16.

The encoder 17 performs EFM modulation for the write data received from the buffer memory 36, and outputs the obtained write data to the strategy circuit 18. The strategy circuit 18, for example, performs a time axis correction process for the EFM signal received from the encoder 17, and outputs the resultant EFM signal to the laser driver 19.

The laser driver 19, under the control of the laser power controller 20, drives the laser diode 53 (see FIG. 3) of the optical pickup 10 in accordance with a signal that is modulated in accordance with the write data and is received from the strategy circuit 10.

The laser power controller 20 controls the power for a laser beam emitted by the laser diode 53 (see FIG. 3) of the optical pickup 10. Specifically, the laser power controller 20 controls the laser driver 19, so that the optical pickup 10 emits the laser beam at an intensity that matches the optical target value of the laser power designated by the control unit 16. The laser power control exercised by the laser power controller 20 is feedback control, using the value of a current supplied by the front monitor diode of the optical pickup 10, for the emission, at the target intensity, of the laser beam by the optical pickup 10.

The image information supplied by the host PC 110 and stored in the buffer memory 36 are transmitted through the control unit 16 to the FIFO memory 34 and are stored therein. In this case, the image information stored in the FIFO memory 34, i.e., the image information supplied to the optical disk recording apparatus 100 by the host PC 110, includes the following information. The image information is used to form a visual image on the face of the optical disk D, and as is shown in FIG. 4, information representing a gradation level (density) is written for each of n coordinates (indicated by black dots) along multiple concentric circles at the center O of the optical disk D. The image information represents the gradation level for each of the coordinate points, in order from the coordinate points P11, P12, . . . and P1n, belonging to the innermost circle, to coordinate points P21, P22, . . . and P2n, belonging to the externally adjacent circle, to the coordinate points along the externally adjacent circle and up to coordinate points Pmn along the outermost circle. The data representing the gradation levels of the coordinate points along the polar coordinate are transmitted to the FIFO memory 34 in the above order. It should be noted that FIG. 4 is a specific diagram clearly showing the positional relationships of the coordinates, and the actual coordinates are located at a higher density. When the host PC 110 employs a commonly used bit map method to prepare image information to be formed on the thermo sensitive face of the optical disk D, the host PC 110 need only convert bit map data into the polar coordinate data described above and transmit the obtained image information to the optical disk recording apparatus 100.

To form a visual image on the thermo sensitive face of the optical disk D based on the thus received image information, the PLL circuit 33 transmits an image recording clock signal to the FIFO memory 34. Each clock pulse of the image recording clock signal, information representing a gradation level for one of the oldest coordinate points that was stored is output by the FIFO memory 34 to the drive pulse generator 35.

The drive pulse generator 35 generates a drive pulse to control the timing at which a laser beam is to be emitted by the optical pickup 10. The drive pulse generator 35 generates a drive pulse having a pulse width that is consonant with information that is read from the FIFO memory 34 and that represents a gradation level for each coordinate point. For example, when the gradation level for a specific coordinate point is comparatively high (the density is high), as is shown in the upper portion in FIG. 5, the drive pulse generator 35 generates a drive pulse having an extended pulse width for a write level (the second intensity). When the gradation level is comparatively low, as is shown in the lower portion in FIG. 5, the drive pulse generator 35 generates a drive pulse having a reduced pulse width for the write level. The write level is a power level whereat, when the laser beam at this level is emitted and irradiates o the thermo sensitive face (photosensitive layer 205) of the optical disk D, the thermo sensitive face is obviously discolored. And when the above described drive pulse is transmitted to the laser driver 19, for a period corresponding to the pulse width, the laser beam at the write level is emitted by the optical pickup 10. Therefore, when the gradation level is high, the laser beam at the write level is emitted longer, and a larger region in the unit area of the thermo sensitive face of the optical disk D is discolored. As a result, the user visually ascertains that the pertinent area is an area having a high density. In this embodiment, the length of the region in the unit area (the unit length) to be discolored varies, so that the image information is expressed at the graduation level represented therein. The servo level (the first intensity) is a power level whereat the thermo sensitive face of the optical disk D is substantially unchanged when irradiated by the laser at the power for this level. For a region that need not be discolored, only the laser beam at this servo level only be emitted instead of the laser beam at the write level.

Figure 6:
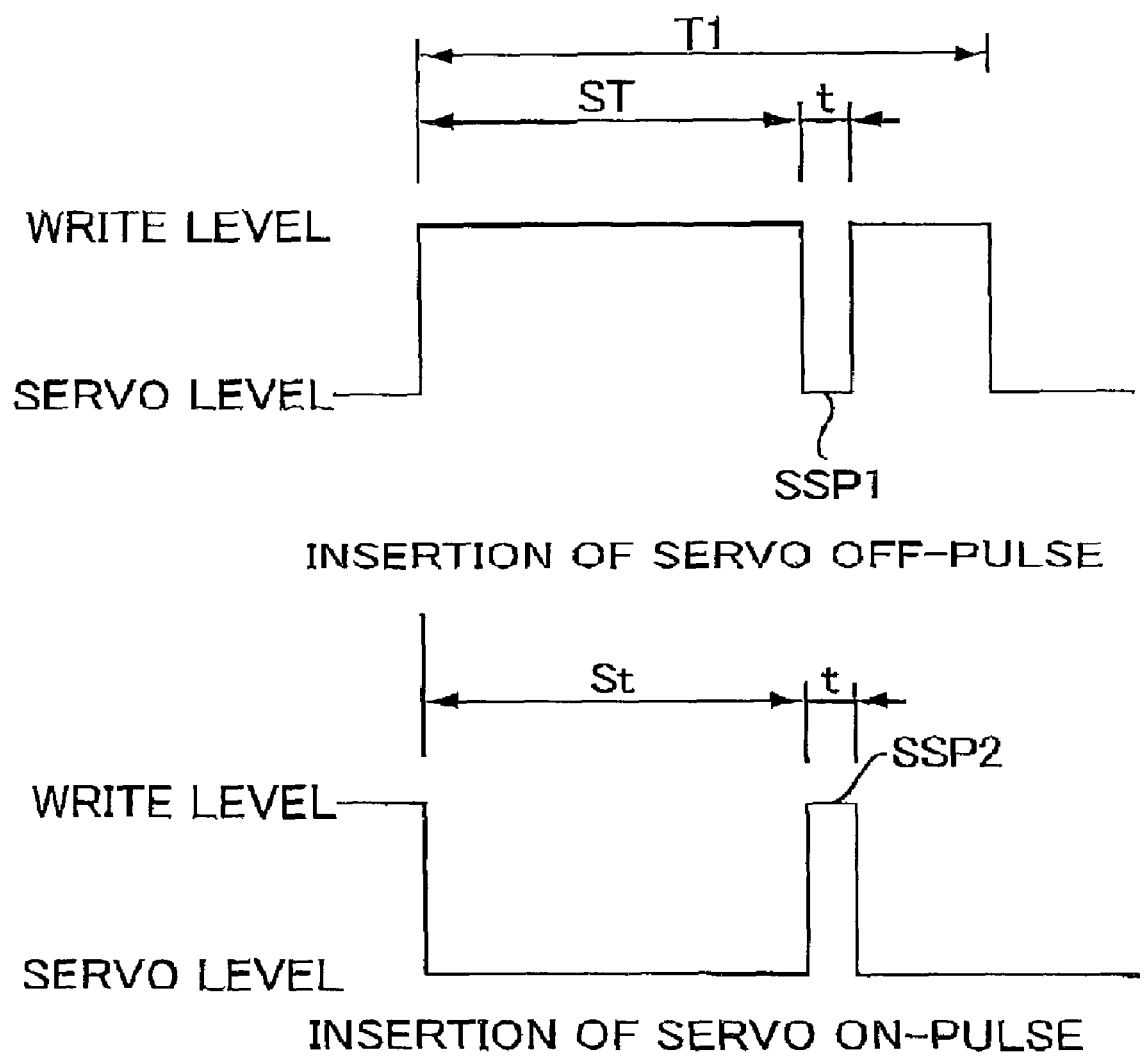
FIG. 6 is a diagram for explaining a laser beam control method employed when the optical disk recording apparatus forms a visual image on the thermo sensitive face of the optical disk.

In addition to generating a drive pulse that is consonant with information representing the gradation level for each coordinate point, regardless of this information, the drive pulse generator 35 inserts a pulse at the write level having a very short cycle, or a pulse at the servo level, when the power control exercised by the laser power controller 20 or the focusing and the tracking control exercised by the servo circuit 13 is required. For example, when, as is shown in the upper portion in FIG. 6, a laser beam at the write level must be emitted for a period T1 in order to express a visual image in accordance with the gradation level at specific coordinates in the image information, and when a laser beam at the write level must be emitted for a period T1 that is longer than a predetermined servo cycle ST for controlling the laser power, a servo off-pulse (SSP1) having a very short period t is inserted at the end of the servo cycle ST. Whereas when, as is shown in the lower portion in FIG. 6, a laser beam at the servo level must be emitted for a period equal to or longer than the servo cycle ST in order to express a visual image in accordance with the gradation level at specific coordinates in the image information, a servo on-pulse (SSP2) is inserted at the end of the servo cycle ST.

Figure 7:
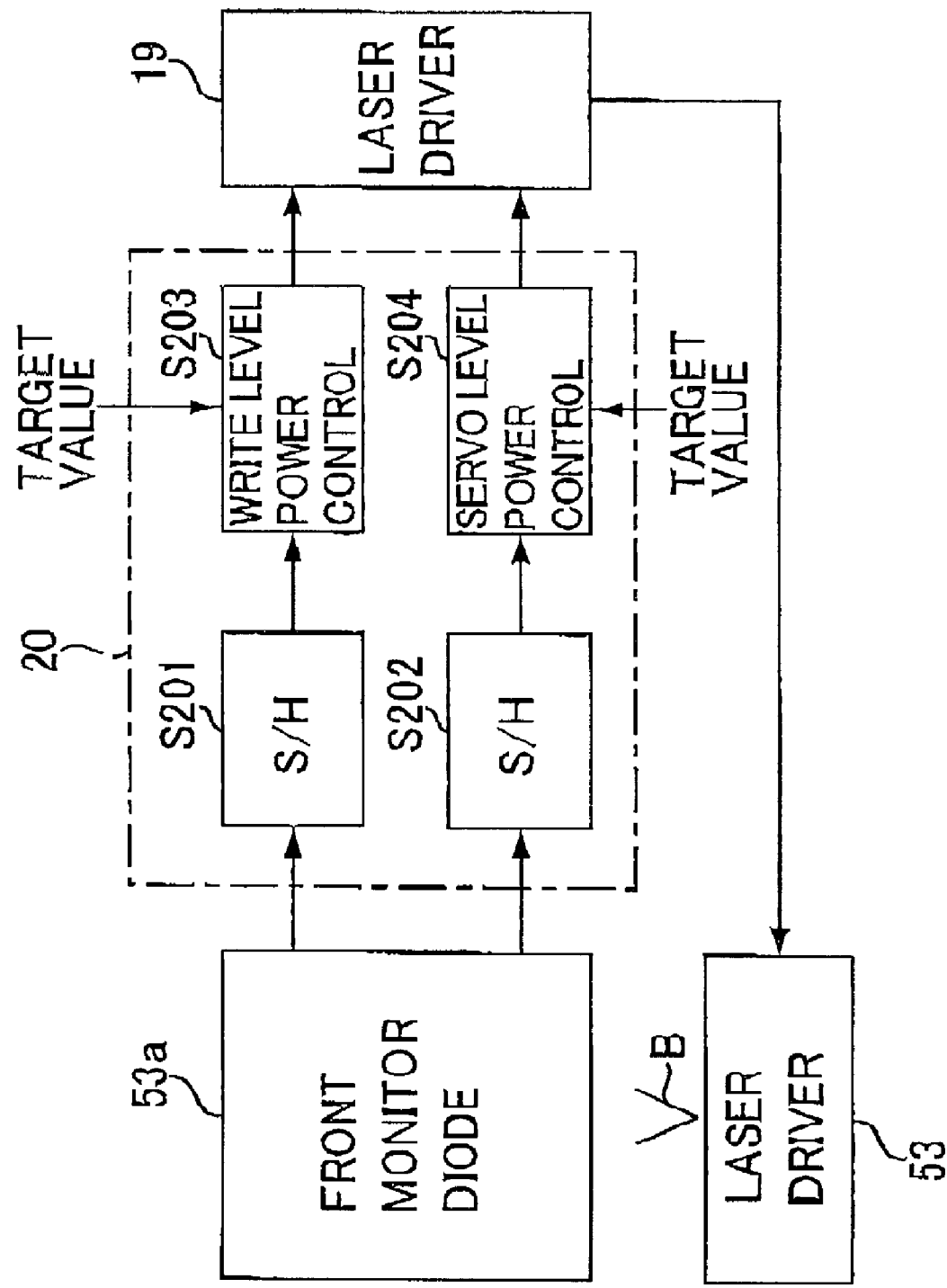
FIG. 7 is a diagram for explaining the laser power control processing performed by a laser power controller that is one component of the optical disk recording apparatus.

As is described above, the laser power controller 20 controls the laser power based on a current (which has a value corresponding to the intensity of the emitted laser beam) supplied by the front monitor diode 53a that receives the laser beam emitted by the laser diode 53 (see FIG. 3) of the optical pickup 10. More specifically, as is shown in FIG. 7, the laser power controller 20 performs sample holding for a value that corresponds to the intensity of a laser beam that is emitted and that is received by the front monitor diode 53a (S201 and S202). Then, since the laser power controller 20 controls the laser power, when the laser beam is emitted at the write level as a target value, i e., when a drive pulse at the write level (see FIGS. 5 and 6) is generated, the sample holding results are employed to emit the laser beam at the target write level transmitted by the control unit 16 (S203). Furthers, since the laser power controller 20 controls the laser power, when a laser beam is emitted at the servo level as a target value, i.e. when the drive pulse at the servo level (see FIGS. 5 and 6) is generated, the sample holding results are employed to emit the laser beam at the target servo level transmitted by the control unit 16 (S204). Therefore, when the drive pulse at the write level or the servo level is not output continuously for a period longer than the predetermined servo cycle (sample cycle) ST, the servo off-pulse SSP1 or the servo on-pulse SSP2 is forcibly inserted, regardless of the contents of the image information, and the laser power control can be exercised for each level in the above described manner.

Figure 8:
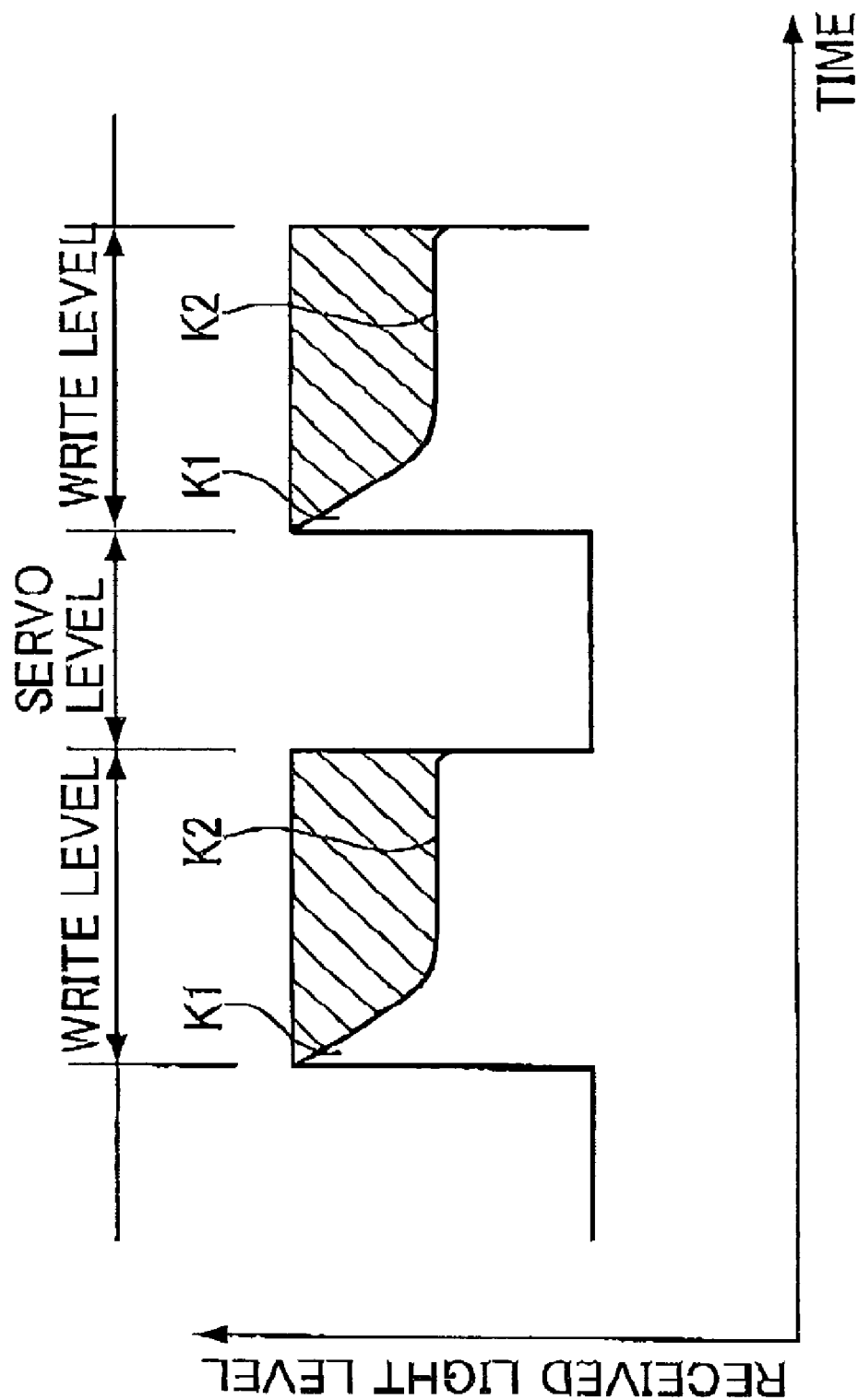
FIG. 8 is a diagram showing returning light of the laser beam that is emitted for the thermo sensitive face of the optical disk by the optical pickup of the optical disk recording apparatus.

The servo off-pulse SSP1 is inserted not only to control the laser power, but also for the focusing or the tracking control performed by the servo circuit 13. That is, the tracking control and the focusing control are performed based on an RF signal that is received by the light-receiving element 56 (see FIG. 3) of the optical pickup 10, i.e., the light (reflected light) of the laser beam that is emitted by the laser diode 53 and is returned from the optical disk D. In FIG. 8 is shown an example signal that is received by the light-receiving element 56 when the photosensitive layer 205 (see FIG. 1) is irradiated by the laser beam. As is shown in FIG. 8. the light of the laser beam at the write level that is reflected includes peak portion K1 at the rising time for the laser beam and shoulder portion K2 whereat the level is thereafter maintained, and the shaded portion is regarded as energy that was used for discoloring the photosensitive layer 205. The energy used for discoloring the photosensitive layer 205 is not limited to a constant specific value, and may vary, depending on the situation. Therefore, it is anticipated that the shape of the shaded portion will vary each time. That is, the reflected light of a laser beam at the write level carries much noise and stable reflected light is not always obtained, and when this reflected light is employed, it will interfere with accurate focusing and tracking control. Therefore, when as described above a laser beam at the write level is continuously emitted for an extended period of time, the reflected light for a laser beam at the servo level can not be obtained, and the focusing control and the tracking control can not be correctly performed.

This is why the servo off-pulse SSP1 is inserted, so that the reflected light for a laser beam at the servo level can be obtained periodically, and the focusing control and the tracking control are preformed based on the reflected light that is obtained. To form a visual image on the thermo sensitive face or the optical disk D, unlike when information is to be recorded to the recording face, tracing along the pregroove (guide groove) that is formed in advance in the optical disk D need not be performed. Therefore, in this embodiment, the target value for the tracking control is set as a fixed value (a predetermined offset value).

This control method can be employed not only for forming image information on the thermo sensitive face, but also for forming image information on the recording face. That is, when a material for which not only the reflectivity but also the color can be changed by being irradiated with a laser beam is employed for the recording face (recording layer 202), an image can be formed on the recording face as well as on the thermo sensitive face. But since when a visual image is formed on the recording face, the original data recording can not be performed on the pertinent portion, it is preferable that the area for recording data and the area for forming a visual image be separated.

It is also preferable that the period required for inserting the servo off-pulse SSP1 and the servo on-pulse SSP2 be minimized so as not to adversely affect various servo controls, such as the laser power control, the tracking control and the focusing control. When the insertion period is greatly reduced, these various servo controls can be exercised while little affecting he visual image that is formed.

Figure 9:
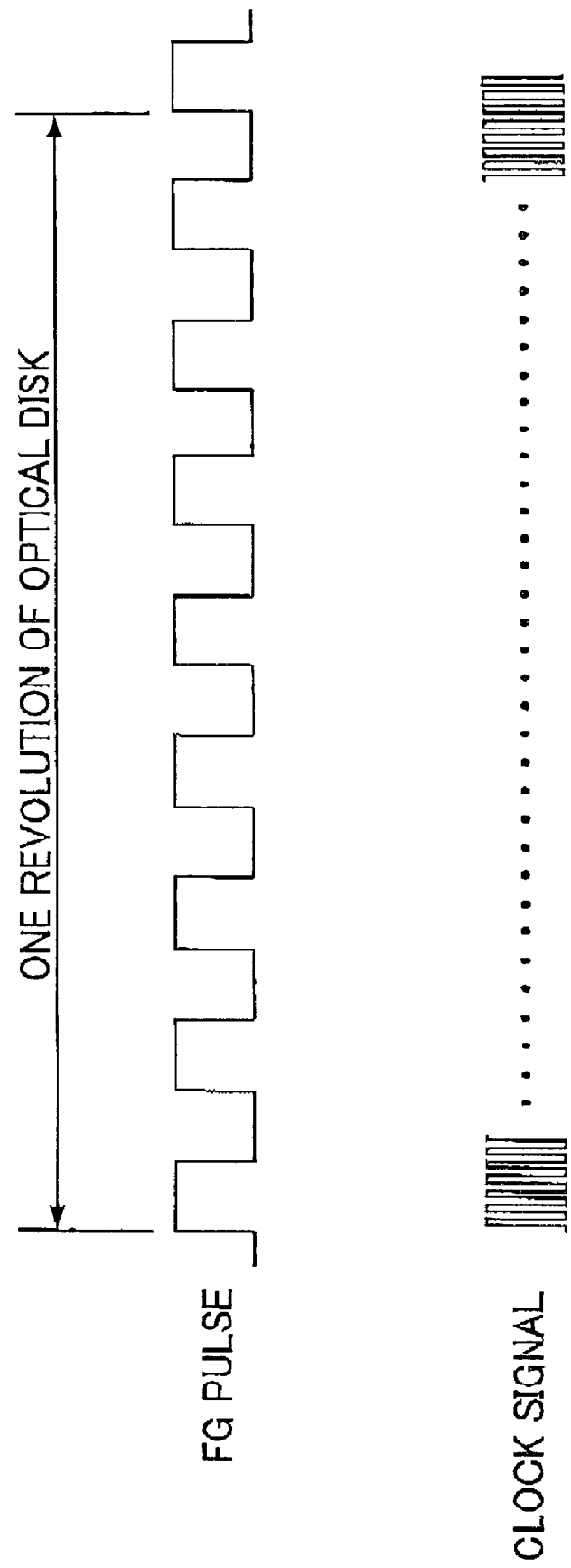
FIG. 9 is a diagram showing an FG pulse that is generated by a frequency generator 21, which is one component of the optical disk recording apparatus, in accordance with the revolutions of a spindle motor, and a clock signal generated based on the FG pulse.

Referring again to FIG. 2, the PLL circuit (signal output means) 33 multiplies the FG pulse signal at a frequency that is supplied by the frequency generator 21 and that is consonant with the speed at which the spindle motor 11 revolves, and outputs a clock signal to be used for forming a visual image, which will be described later. The frequency generator 21 employs a counter-electromotive current that is obtained by the motor driver of the spindle motor 11 and outputs the FG pulse at a frequency consonant with the number of spindle revolutions. For example, when as is shown in the upper portion in FIG. 9 the frequency generator 21 generates eight FG pulses while the spindle motor 11 rotates one revolution, i.e., when the optical disk D is rotated one revolution, as is shown in the lower portion in FIG. 9, the PLL circuit 33 outputs a clock signal having a frequency equivalent to a multiple of the FG pulse (for example, a frequency equivalent to five times the FG pulse signals, or 40 pulses at level H during one revolution of the optical disk D), i.e., outputs a clock signal having a frequency that is consonant with the speed at which the optical disk D is rotated by the spindle motor 11. As a result, the clock signal obtained by multiplying the FG pulse signal is output by the PLL circuit 33 to the FIFO memory 34, and for each cycle of the clock signal, i.e., for each rotation of the disk D at a specific angle, data from the FIFO memory 34 that represents the gradation level at one coordinate point is output to the drive pulse generator 35. The PLL circuit 33 is employed to generate a clock signal obtained by multiplying the FG pulse. And when a motor that has a satisfactorily stable driving capability is employed, instead of the PLL circuit 33, a crystal oscillator may be employed to generate the above described clock signal obtained by multiplying the FG pulse, i.e., a clock signal having a frequency that is consonant with the speed at which the optical disk D is revolve.

The stepping motor 30 is a motor for moving the optical pickup 10 in the direction of the diameter of the optical disk D that is loaded. The motor driver 31 rotates the stepping motor 30 at a speed consonant with the pulse signal supplied by the motor controller 32. And in accordance with a moving start instruction that is issued by the control unit 16 and that includes the direction and the distance whereat the optical pickup 10 is moved along the diameter, the motor controller 32 generates a corresponding pulse signal and outputs it to the motor driver 31. When the stepping motor 30 moves the optical pickup 10 in the direction of the diameter of the optical disk D, and when the spindle motor 11 rotates the optical disk D, the laser irradiation position of the optical pickup can be set for various locations on the optical disk D, and the above described components constitute irradiation position adjustment means.

The control unit 16 is constituted by a CPU (Central Processing Unit), a ROM (Read Only Memory) and a RAM (Random Access Memory), and controls the individual sections of the optical disk recording apparatus 100 in accordance with a program stored in the ROM, so that the recording process for the recording face of the optical disk D and the image forming process for the thermo sensitive face of the optical disk D are concentrically controlled.

The configuration of the optical disk recording apparatus 100 for this embodiment has been explained.

B. Operation for the Embodiment

Figure 10:
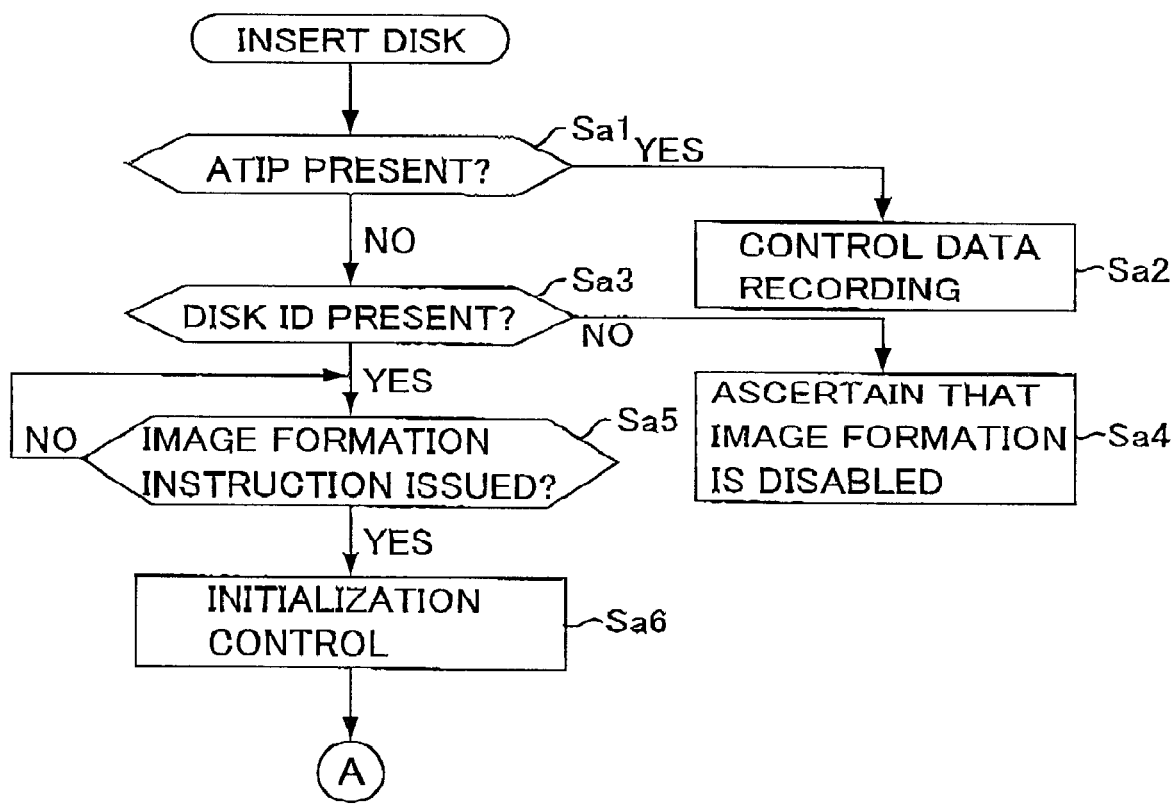
FIG. 10 is a flowchart for explaining the operation of the optical disk recording apparatus.

The operation of the thus arranged optical disk recording apparatus 100 will now be described. As is described above, the optical disk recording apparatus 100 can record, to the recording face of the optical disk D, information such as music data received from the host PC 110, and can also form, on the thermo sensitive face of the optical disk D, a visual image that corresponds to the image information supplied by the host PC 110. While referring to FIGS. 10 and 11, an explanation will now be given for the operation of the optical disk recording apparatus 100 that can perform data recording and visual image forming.

When the optical disk D is loaded into the optical disk recording apparatus 100, first, the control unit 16 controls the optical pickup 10, for example, and determines whether the ATIP (Absolute Time In Pregroove) data are recorded to the face of the optical disk D opposite the optical pickup 10 (step Sa1). As is well known, the ATIP data are those recorded in advance to the recording face of a CD-R along the pre-groove, and when the ATIP data have been recorded, it can be ascertained that the optical disk D is set up so that the recording face is directed toward the optical pickup 10. When the ATIP data have not been recorded, it can be ascertained that the optical disk D is set up so that the thermo sensitive face is directed toward the optical pickup 10. That is, the control unit 16 detects the presence/absence of the ATIP data, and ascertains which face of the loaded optical disk D is directed toward the optical pickup 10. In addition to the above method for detecting the presence/absence of the ATIP data to determine which face of the optical disk D is directed toward the optical pickup 10, another method may be employed. For example, when the focus servo process is performed, the servo contents may be employed to identify the face of the optical disk D that is directed toward the optical pickup 10. That is, since the distance between the optical pickup and the opposite face of the optical disk D differs greatly, depending on which face of the optical disk D is directed toward the optical pickup 10, the difference in the distance affects the focus servo control value, and with this value, the face of the loaded optical disk D that is directed toward the optical pickup 10 can be identified.

When the ATIP data is detected on the optical disk D, it is assumed that the optical disk D is set up so that the recording face is directed toward the optical pickup 10, and the control unit 16 performs a process for recording to the recording face the write data supplied by the host PC 110 (step Sa2). Since the process for recording the write data is the same as that performed by a conventional optical disk recording apparatus (a CD-R drive), no further explanation will be given.

Figure 12:
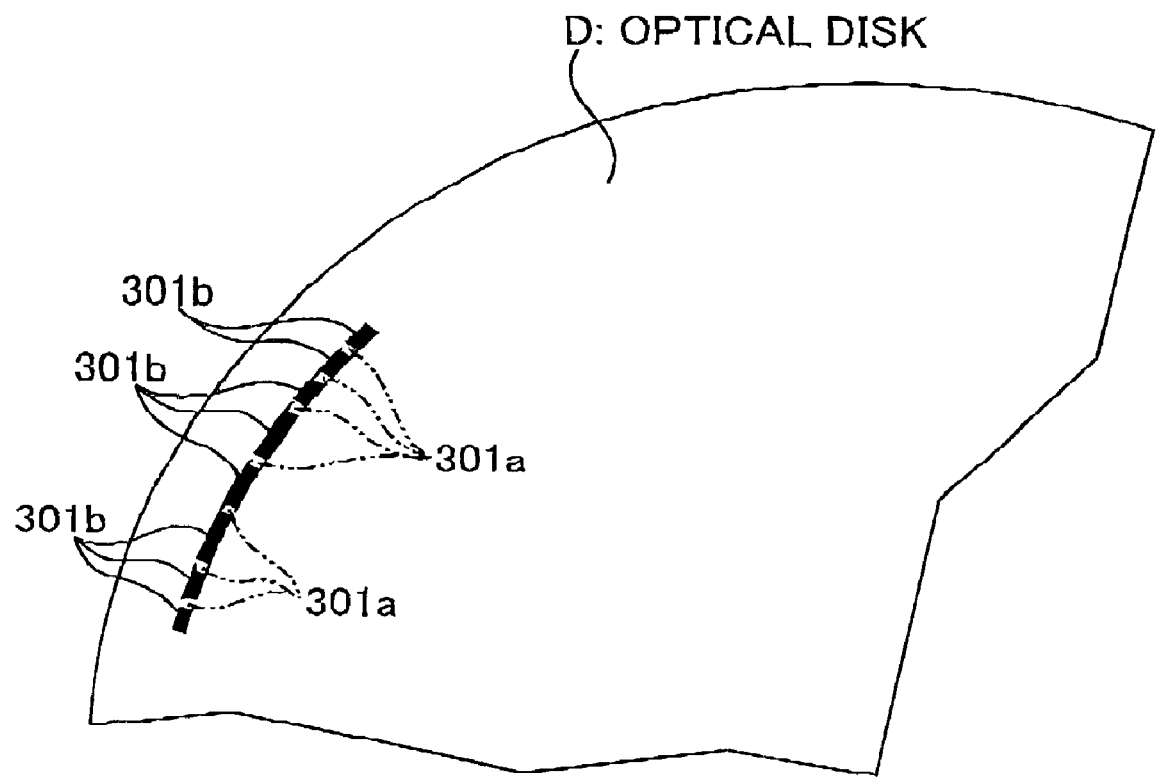
FIG. 12 is a diagram showing a disk ID recorded on the thermo sensitive face of the optical disk.

When the ATIP data is not detected on the optical disk D, it is assumed that the optical disk D is set up so that the thermo sensitive face is directed toward the optical pickup 10, and the control unit 16 determines whether the disk ID of the optical disk D can be obtained (step Sa3). In this embodiment, the disk ID of the optical disk D is recorded to the thermo sensitive face of the optical disk D (see FIG. 1) having the recording face and the thermo sensitive face. For example, as is shown in FIG. 12, a visual image that corresponds to the data code for the disk ID is recorded along the outermost circumferential edge of the thermo sensitive face of the optical disk D. In this embodiment, as is shown in FIG. 12, to record the disk ID to the thermo sensitive face of the optical disk D, reflective regions 301a and non-reflective regions 301b having a length corresponding to the code are formed along the outermost circumferential edge. The control unit 16 traces the laser irradiation position of the optical pickup 10 along the outermost edge of the optical disk D, and obtains the disk ID based on the reflected light.

Therefore, when the reflective regions 301a and the non-reflective regions 301b that correspond to the disk ID are not formed in the outermost portion of the thermo sensitive face, it can be ascertained that the optical disk D is an ordinary optical disk, such as a CD-R, that does not have a thermo sensitive face. When, as in this case, a disk ID can not be obtained, the control unit 16 ascertains that the optical disk D is one for which visual image forming is disabled (step Sa4), and notifies a user of this determination.

When the disk ID can be obtained from the optical disk D, the control unit 16 waits until an image forming instruction including the image information is issued by the host PC 110 (step Sa5). When the image forming instruction is issued, the control unit 16 performs initialization in order to form a visual image on the thermo sensitive face of the optical disk D (step Sa6). More specifically, the control unit 16 permits the servo circuit 13 to rotate the spindle motor 11 at a predetermined angular speed, or issues to the motor controller 32 an instruction for moving the optical pickup 10 to the initial innermost position along the diameter of the optical disk D, and permits the motor controller 32 to drive the stepping motor 30.

Furthermore, in the initialization process for image forming, the control unit 16 issues a target focus control value to the servo circuit 13, so that the thermo sensitive face of the optical disk D is irradiated with a laser beam that has the diameter of a beam spot larger than the one when information is recorded to the recording face.

Figure 13:
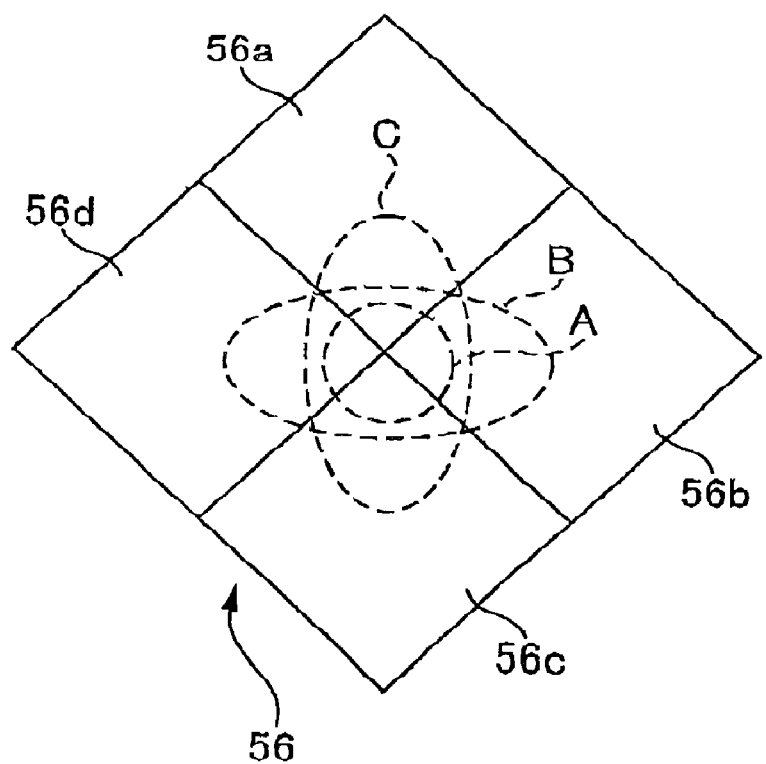
FIG. 13 is a diagram showing shapes of the returning laser beams that are received by the light-receiving element of the optical pickup of the optical disk recording apparatus.

A more specific explanation will now be given for the focusing control process performed when the above described target value is designated. As is described above, the servo circuit 13 performs the focusing control based on a signal output by the light-receiving element 56 of the optical pickup 10. In the process for recording data to the recording face of the optical disk D, the servo circuit 13 drives the focus actuator 64 (see FIG. 3) so that circular return light A in FIG. 13 is received at the center formed by four areas 56a, 56b, 56c and 56d of the light-receiving element 56 in FIG. 13. That is, when the amounts of light received in the areas 56a, 56b, 56c and 56d are defined as a, b, c and d, the focus actuator 64 is driven so that (a+c)−(b+d)=0 is established.

For forming a visual image on the thermo sensitive face of the optical disk D, the focusing control is performed so that the thermo sensitive face is irradiated by the laser beam that has a diameter larger than the one when the information is recorded to the recording face. When the shape of return light received by the light-receiving element 56 in FIG. 13 is an ellipse (B or C in FIG. 13), the servo circuit 13 drives the focus actuator 64 so that this elliptical return light can be received by the light-receiving element 56, because the spot of the laser beam B or C is larger than the circular laser beam A. In other words, the focus actuator 64 is driven to satisfy (a+c)−(b+d)=a (a is not 0). Therefore, in this embodiment, the control unit 16 and the servo circuit 13 constitute beam spot control means.

As is described above, when the control unit 16 permits the servo circuit 13 to set a (not 0) in the initialization process for forming the visual image, the thermo sensitive face of the optical disk D can be irradiated with the laser beam having a spot diameter larger than the one when the information is recorded to the recording face. Since the thermo sensitive face of the optical disk D is irradiated with the laser beam of a spot diameter larger than the one when information is recorded to the recording face, the following effects can be obtained. That is, in the embodiment, while the optical disk D is rotated the laser beam is emitted for forming a visual image, as well as in recording data to the recording face. Therefore, when the diameter of the beam spot of the laser beam is increased, a visual image can be formed across the entire thermo sensitive face of the optical disk D within a shorter period of time. This reason will now be described while referring to FIG. 14. In a comparison between a large beam spot diameter BS and a small beam spot of the laser beam that is emitted, as specifically shown in FIG. 14, when the optical disk D is rotated one revolution, the size of the area for forming a visual image is extended when the beam spot diameter BS is large. Therefore, when the beam spot diameter BS is small, the optical disk D must be rotated more to form a visual image across the entire area (in the example, in FIG. 14, four revolutions when the beam spot diameter BS is large, or six revolutions when the beam spot diameter BS is small), so that an extended period of time is required for image forming. For this reason, in the process for forming a visual image, the optical disk recording apparatus 100 in this embodiment emits the laser beam having a larger spot diameter than the one for data recording.

In the initialization process for image forming, the control unit 16 instructs the laser power controller 20 target values for the write level and the servo level, so that the optical pickup 10 emits the laser beam at the write level and the servo level that are consonant with the obtained disk ID. That is, the target values for the write level and the servo level are stored in the ROM of the control unit 16 for each of a plurality of disk ID types. The control unit 16 reads the target values for the write level and the servo level that correspond to the obtained disk ID, and instructs these target values to the laser power controller 20.

Based on the following reasons, the target power values are set in accordance with the disk ID. The characteristic of the photosensitive film used as the photosensitive layer 205 may differ depending on the type of the optical disk D, and when the characteristic differs, the characteristic for the level of power of the laser beam that is emitted to discolor the thermo sensitive face is accordingly changed. Therefore, while the photosensitive layer 205 of a specific optical disk D is irradiated with the laser beam at a specific write level and is satisfactorily discolored, the photosensitive layer 205 of another optical disk D can not always be discolored by being irradiated with the laser beam at the same write level. Therefore, in this embodiment, for optical disks that correspond to various disk IDs, the target values for the write level and the servo level are obtained in advance through experiments. Then, the obtained target values are stored in the ROM in correlation with the individual disk IDs, so that optical power control can be exercised in accordance with the characteristics of the photosensitive layers 205 of various optical disks D.

Figure 11:
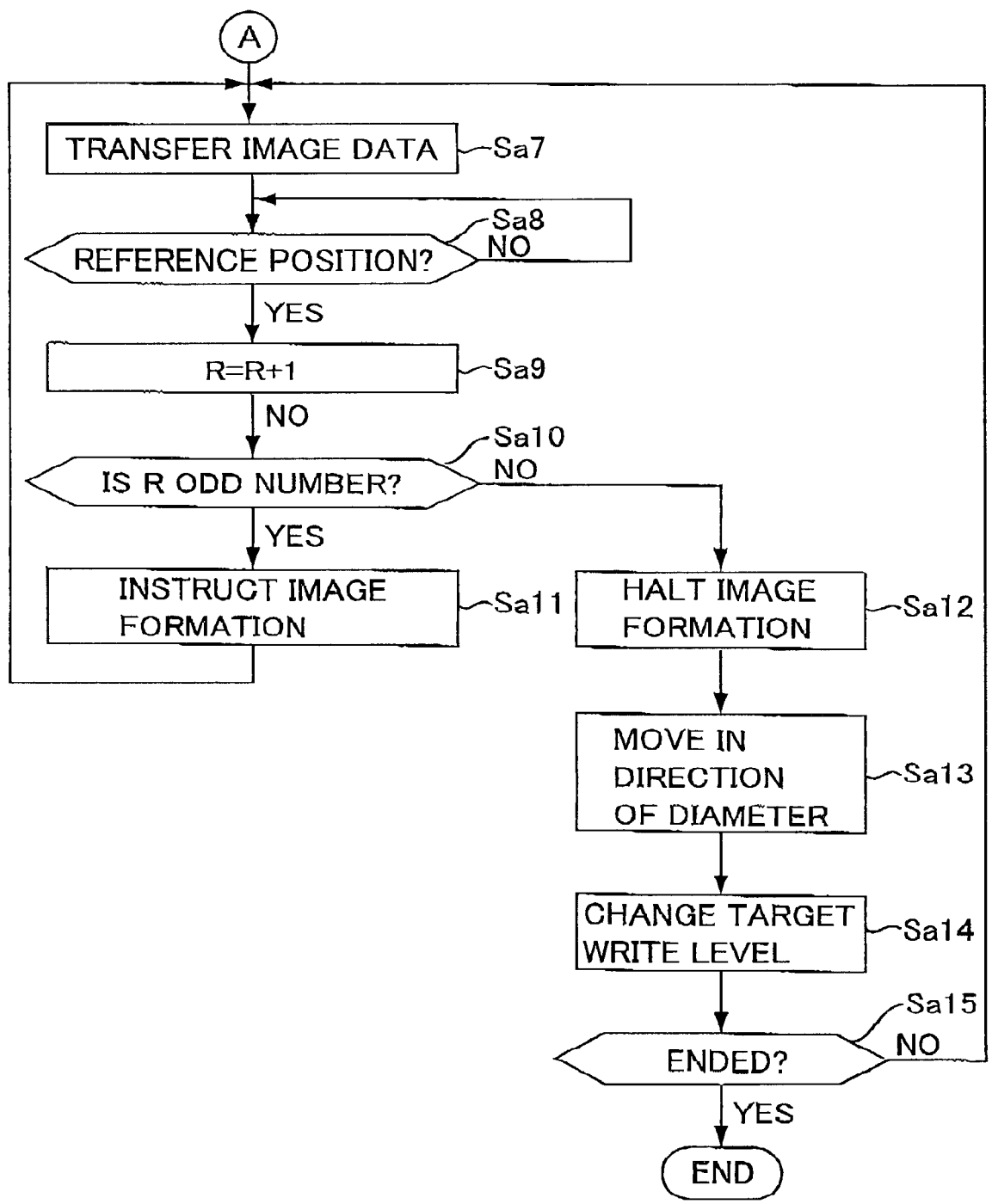
FIG. 11 is a flowchart for explaining the operation of the optical disk recording apparatus.

When the control unit 16 performs the above described initialization, the process for forming a visual image on the thermo sensitive face of the optical disk D is actually started. As is shown in FIG. 11, first, the control unit 16 transmits to the FIFO memory 34 image information received from the host PC 110 through the buffer memory 36 (step Sa7). Then, the control unit 16 employs an FG pulse signal received from the frequency generator 21 to determine whether a predetermined reference position of the optical disk D that is rotated by the spindle motor 11 has passed through the laser irradiation position of the optical pickup 10 (step Sa8).

Figure 15:
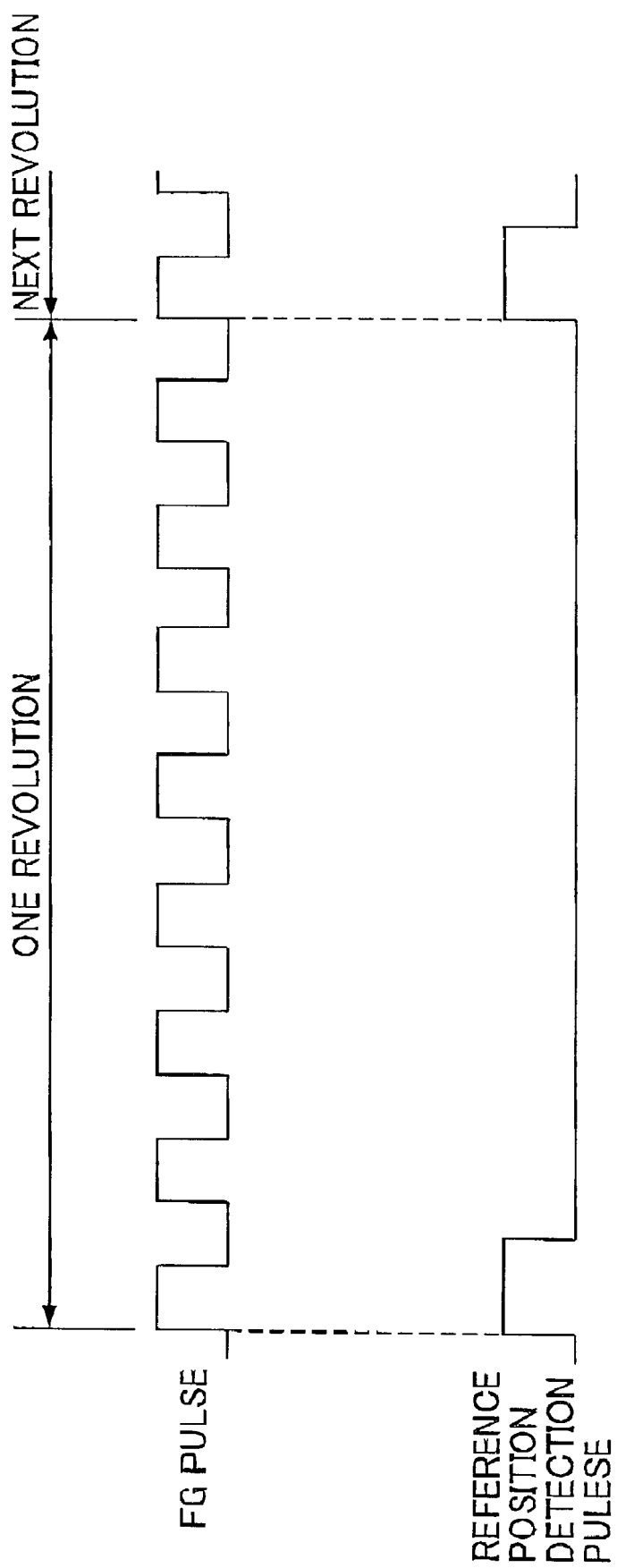
FIG. 15 is a diagram for explaining a method for determining that the laser irradiation position of the optical disk recording apparatus has passed through the reference position of the optical disk.
Figure 16:
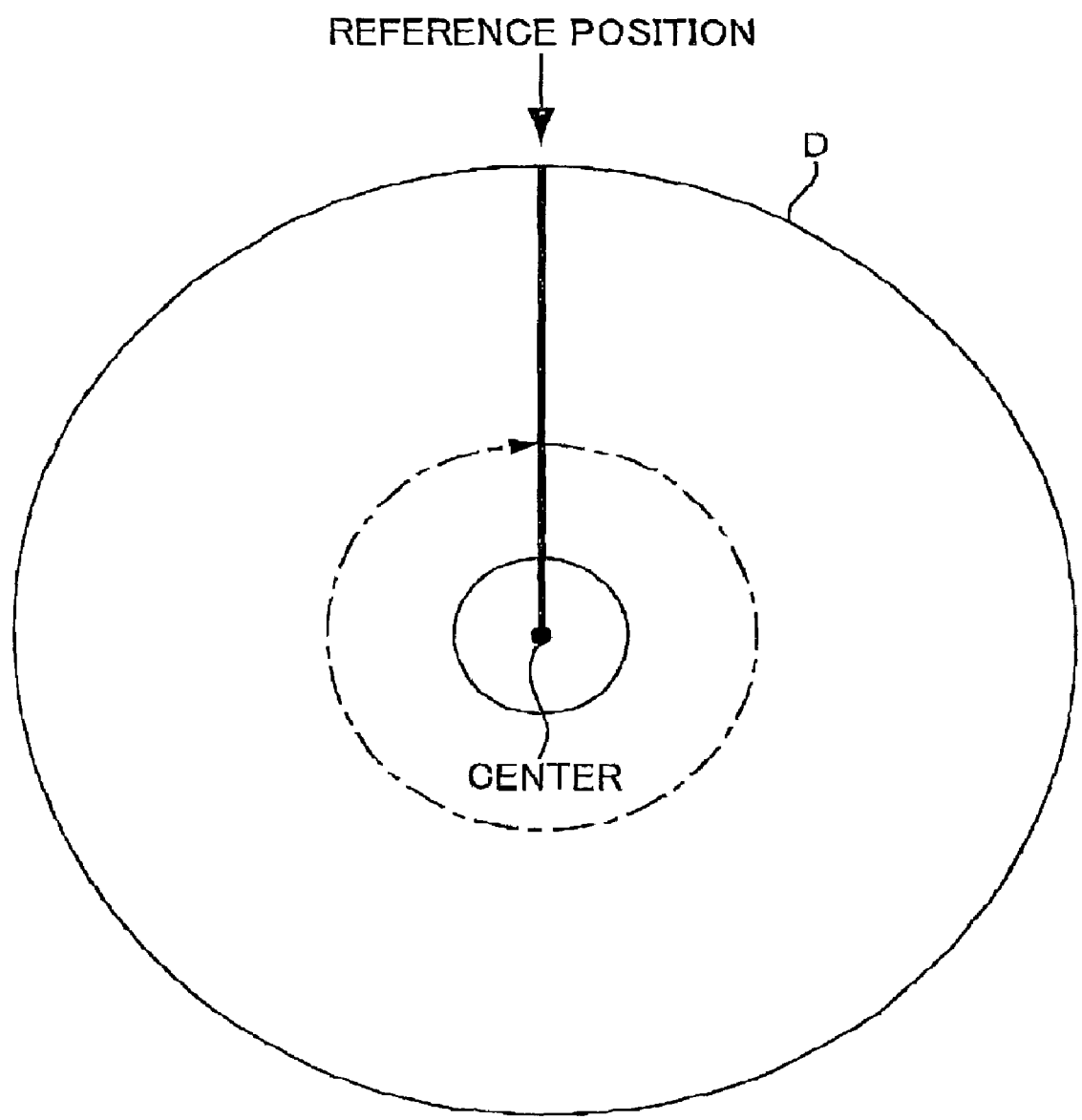
FIG. 16 is a diagram for explaining a method for determining that the laser irradiation position of the optical disk recording apparatus has passed through the reference position of the optical disk.

While referring to FIGS. 15 and 16, an explanation will now be given for a method for detecting the predetermined reference position, and for determining whether the laser irradiation position has passed through the reference position. As is shown in FIG. 15, the frequency generator 21 outputs a predetermined number of FG pulses (eight FG pulses in this example) while the spindle motor 11 is rotated one revolution, i.e., the optical disk D is rotated one revolution. Therefore, the control unit 16 outputs one of the FG pulses received from the frequency generator 21 as a reference position detection pulse in synchronization with the rising time of a reference pulse. The control unit 16 thereafter generates a reference position detection pulse signal in synchronization with the rising timing of the last pulse (the eighth pulse in this example) from the reference position detection pulse in a period equivalent to one revolution. Since the reference position detection pulse is generated, this pulse generation timing can be identified as the timing whereat the laser irradiation position of the optical pickup 10 passed through the reference position of the optical disk D. Specifically, as is shown in FIG. 16, assume that the laser irradiation position of the optical pickup 10 at the timing whereat the first reference position detection pulse is generated is defined as the position indicated by a thick line (since the optical pickup 10 can be moved in the diameter direction, an available irradiation position is represented by a line). Even when the reference position detection pulse is generated after one revolution, the laser irradiation position of the optical pickup 10 is the position indicated by a thick line. As is described above, when the first reference position detection pulse is generated, the line in the diameter direction where the laser irradiation position belongs is defined as a reference position, and the control unit 16 can employ the reference position detection pulse signal, which is generated each time the optical disk D is rotated once, to detect the passage of the laser irradiation position through the reference position of the optical disk D. The chained line in FIG. 16 describes an example trajectory for the laser irradiation position from the time a specific reference position detection pulse was generated until the next reference position detection pulse was generated.

When, upon receiving the image forming instruction from the host PC 110, the control unit 16 has detected using the above method that the laser irradiation position has passed through the reference position of the optical disk D, the control unit 16 increments, by one, a variable R representing the number of revolutions (step Sa9), and determines whether the variable R is an odd number (step Sa10).

Figure 17:
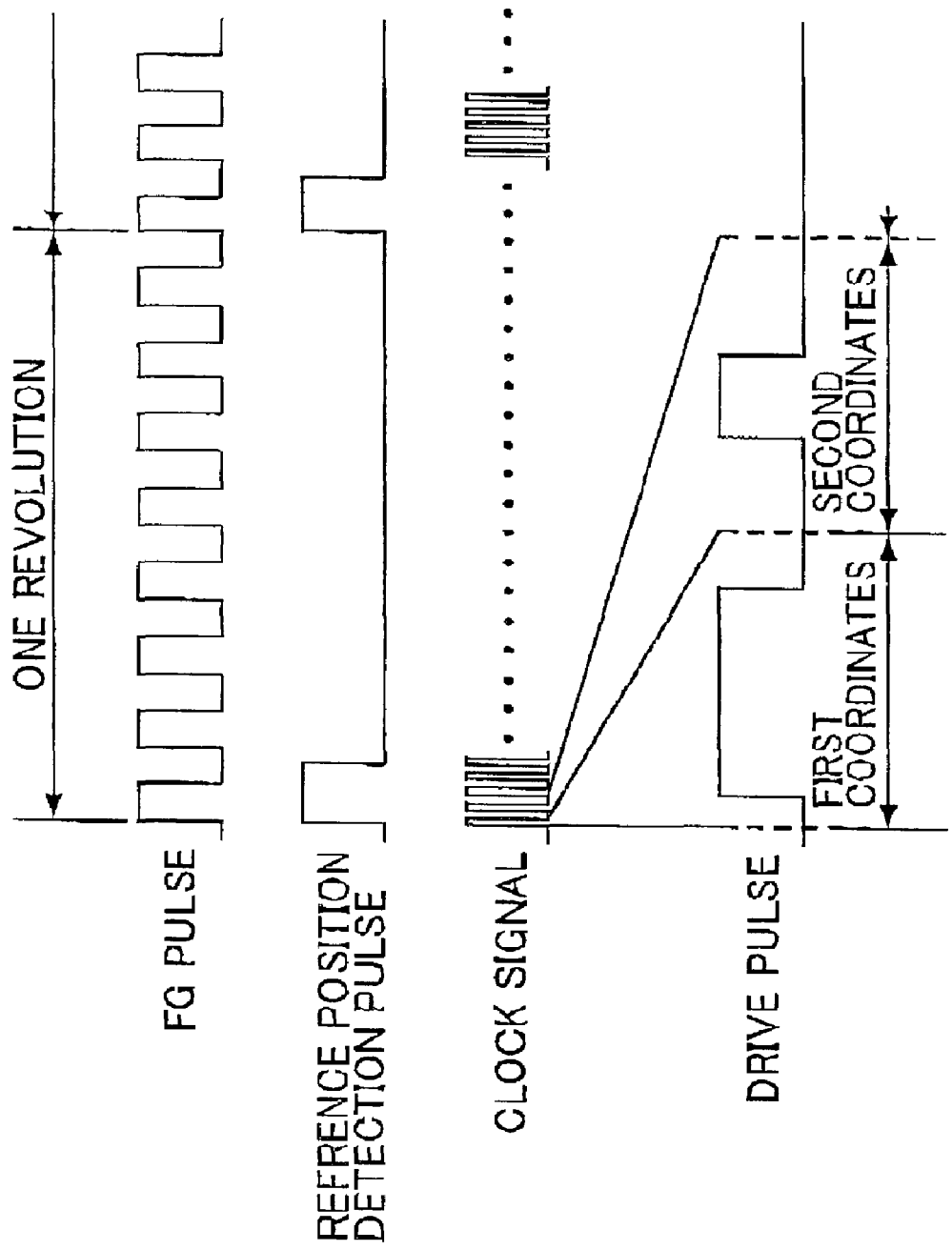
FIG. 17 is a timing chart for explaining the operation of the optical disk recording apparatus performed for emitting a laser beam to form a visual image on the thermo sensitive face of the optical disk.

In this case, when upon receiving the image forming instruction the controller detects for the first time that the reference position has been passed, R=0 (initial value)+1=1 is established, and at step Sa10 it is ascertained that the variable R is an odd number. When it is ascertained that the variable R is an odd number, the control unit 16 permits the optical pickup 10 to emit the laser beam to irradiate the thermo sensitive face of the optical disk D in order to form a visual image (step Sa11). More specifically, the control unit 16 controls the individual sections, so that image information from the FIFO memory 34 are sequentially output in synchronization with a clock signal that has been output by the PLL circuit 33 since the reference position detection pulse was received. Under the control of the control unit 16, as is shown in FIG. 17, upon the reception of each clock pulse from the PLL circuit 33, information from the FIFO memory 34 indicating the gradation level for one coordinate point is output to the drive pulse generator 35. In accordance with the gradation level indicated by the information, the drive pulse generator 35 generates a drive pulse having a corresponding pulse width and outputs it to the laser driver 19. As a result, the optical pickup 10 emits the laser beam at the write level to irradiate the thermo sensitive face of the optical disk D only for a period consonant with the gradation level of each coordinate point. Since the irradiated area is discolored, a visual image as shown in FIG. 18 can be formed.

Figure 18:
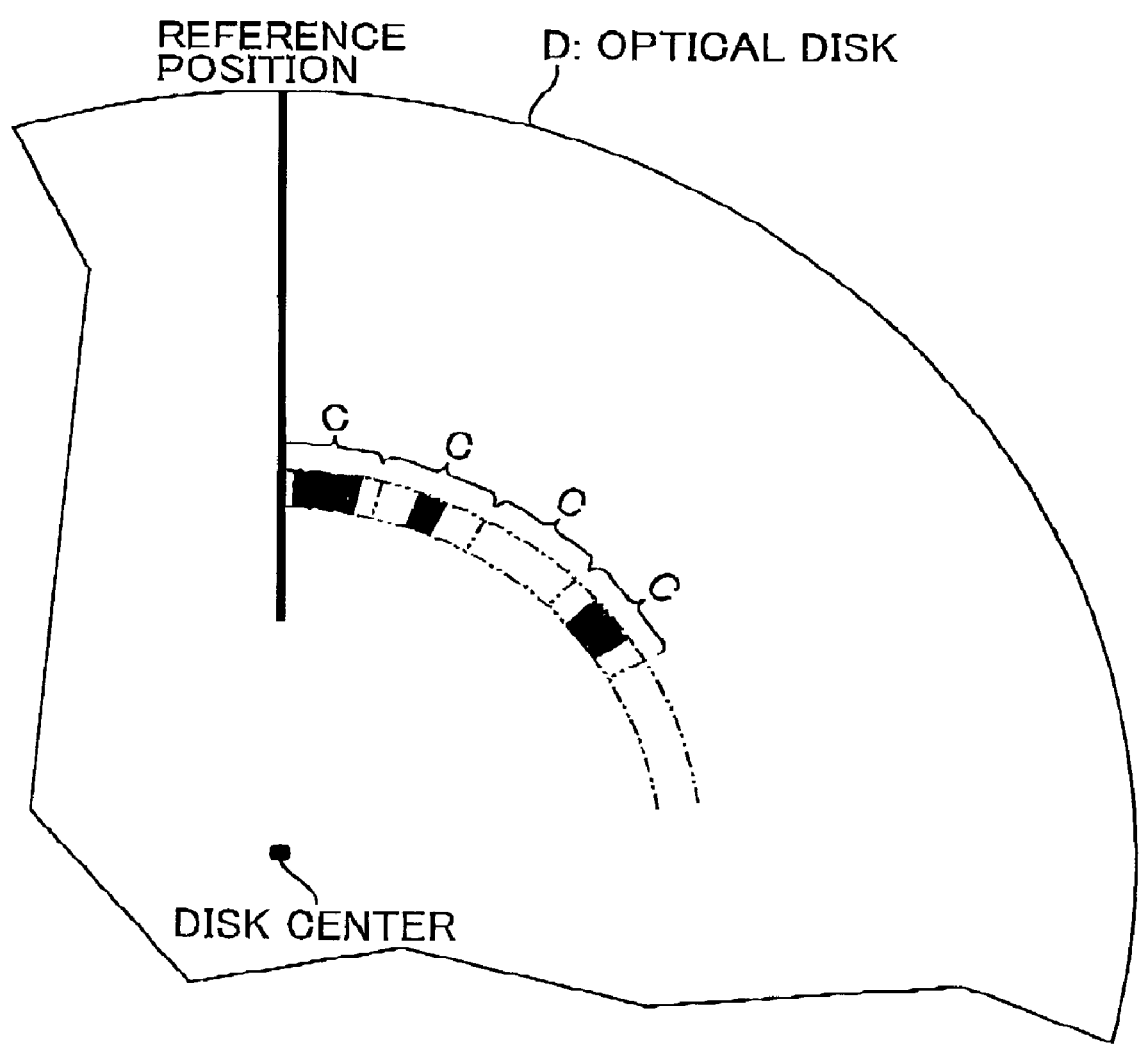
FIG. 18 is a diagram showing the thermo sensitive face of the optical disk to which a laser beam is emitted by the optical disk recording apparatus.

As in specifically shown in FIG. 18, since the optical disk D is rotated by the spindle motor 11, during one clock signal cycle (a period extending from the rising time for a pulse to the rising time for the next pulse) the laser irradiation position of the optical pickup 10 is moved along the circumference a distance equivalent to the regions indicated by C in FIG. 18. While the laser irradiation position is passing through the regions C, the period for the irradiation performed with the laser beam at the write level is changed in accordance with the gradation level, so that in the regions C the dimensions of the areas discolored differ in accordance with different gradation levels. Since the period during which the laser beam at the write level is emitted while passing through each region C is adjusted in accordance with the gradation level of each coordinate point, a visual image consonant with the image information can be formed on the thermo sensitive face of the optical disk D.

When the control unit 16 has performed the above irradiation process for forming a visual image by using the laser beam that is controlled in accordance with the image information, the process for the control unit 16 is returned to step Sa7 and image information supplied from the buffer memory 36 are transmitted to the FIFO memory 34. Then, the control unit 16 determines whether the laser irradiation position of the optical disk D has passed through the reference position of the optical disk D. When the control unit 16 determines that the laser irradiation position has passed through the reference position, it increments the variable R by one. And when, as a result, the variable R becomes an even number, the control unit 16 exercises control of the individual sections and halts the use of the laser beam for irradiating the optical disk D and forming the visual image (step Sa12). More specifically, the control unit 16 prevents information indicating the gradation level of each coordinate point from being transmitted, in synchronization with a clock signal received from the PLL circuit 33, from the FIFO memory 34 to the drive pulse generator 35. That is, after the visual image has been formed using the laser beam at the write level, the control unit 16 halts the use of the laser beam to irradiate and discolor the thermo sensitive face while the optical disk D is rotated another revolution.

When the control unit 16 has halted the laser beam irradiation for visual image formation, the control unit 16 instructs the motor controller 32 to move the optical pickup 10 a predetermined distance toward the outer edge in the direction of the diameter (step Sa13). Upon receiving this instruction, the motor controller 32 drives the stepping motor 30 through the motor driver 31, and the optical pickup 10 is moved the predetermined distance toward the outer edge.

As is described above, the predetermined distance whereat the optical pickup 10 is moved in the direction of the diameter of the optical disk D can be appropriately determined in accordance with the beam spot diameter BS (see FIG. 14) of the laser beam emitted by the optical pickup 10. That is, to form a visual image on the thermo sensitive face of the optical disk D, it is necessary for the laser irradiation position of the optical pickup 10 be moved very near the surface of the optical disk D in order to form an image having a higher quality. Therefore, when the length of the travel distance unit of the optical pickup 10 in the direction of the diameter is defined as substantially the same as the beam spot diameter BS of the laser beam employed to irradiate the optical disk D, the laser beam can be emitted very near the surface of the optical disk D, and an image having a higher quality can be formed. Due to various factors, such as the property of the thermo sensitive face, a region larger than the beam spot diameter of the emitted laser may be colored. In this case, while taking into account the width of the colored regions, the travel distance unit need only be determined so that it does not overlap adjacent colored regions. In this embodiment, since the beam spot diameter BS is larger (e.g., about 20 μm) than the one for recording data to the recording face, the control unit 16 permits the motor controller 32 to drive the stepping motor 30, so that the optical pickup 10 is moved in the direction of the diameter at a distance substantially equivalent to the beam spot diameter BS. It should be noted that a recent stepping motor 30 employs the μ step technique to adjust the travel distance using a 10 μm unit. Thus, using the stepping motor 30 to move the optical pickup 10 in units of 20 μm in the direction of the diameter can be satisfactorily implemented.

After the optical pickup 10 has been moved a predetermined distance in the direction of the diameter, in order to change the target write level of the laser value, the control unit 16 instructs the laser power controller 20 to use the updated write level whereat the laser beam is supposed to be emitted (step Sa14). In this embodiment, the method used to form a visual image is the CAV method whereby the laser beam is emitted while the optical disk D is rotated at a consistent angular speed. When the optical pickup 10 is moved toward the outer edge in the above described manner, the linear velocity is increased. Therefore, when the optical pickup 10 is moved in the direction of the diameter (toward the outer edge), a target write level value is set that is greater than the current value, so that the laser power can be obtained at an intensity whereat, even when the linear velocity is changed, the thermo sensitive face of the optical disk D can be sufficiently discolored.

After the optical pickup 10 has been moved in the direction of the diameter and the target write level has been changed, the control unit 16 determines whether there are any unprocessed image information for visual image formation, i.e., whether there are still image information that have not been transmitted to the drive pulse generator 35. When no such image information are present, this processing is terminated.

When there are unprocessed image information that have not yet been transmitted to the motor controller 32, program control returns to step Sa7, and the process for forming a visual image is repeated. Specifically, the control unit 16 transmits image information to the FIFO memory 34 (step Sa7) and determines whether the laser irradiation position has passed through the reference position of the optical disk D (step Sa8). When the laser irradiation position has passed through the reference position, the control unit 16 increments, by one, the variable R indicating the number of revolutions (step Sa9), and determines whether the updated variable R is an odd number (step Sa10). When the variable R is an odd number, the control unit 16 controls the individual sections to emit the laser beam to form a visual image. And when the variable R is an even-number, the control unit 16 halts the laser emitted to form a visual image (emits the laser beam at the servo level), and performs the control processes, such as moving the optical pickup 10 in the direction of the diameter and changing the target write level value. That is, when the laser beam (including a write level) for image forming is emitted and used to irradiate the optical disk D during a specific revolution, the next revolution the control unit 16 halts the laser irradiation used for image forming, and instead, moves the optical pickup 10 in the direction of the diameter. Since the moving of the optical pickup 10 and the changing of the target write level are performed during the revolution in which the image forming is not performed, image forming is halted while the irradiation position and the power value of the laser beam that is emitted are changed, and the laser irradiation used for image forming can be started after the irradiation position and the intensity of the laser beam are settled. Therefore, the quality of a visual image can be protected from being deteriorated due to the travel of the optical pickup 10 in the direction of the diameter.

The primary operation of the optical disk recording apparatus 100 for this embodiment has been explained. According to the optical disk recording apparatus 100, without printing means being additionally mounted, the individual sections of the optical pickup 10 can be utilized to the extent possible for recording data to the recording face, and the laser beam can be emitted and used for irradiating the thermo sensitive face provided for the optical disk D for the formation of a visual image in accordance with the image information.

Furthermore, in this embodiment, the laser irradiation timing is controlled based on a clock signal that is generated using an FG pulse produced in accordance with the rotation of the spindle motor 11, i.e., a clock signal that is generated in accordance with the number of revolutions of the optical disk D. Therefore, the optical disk recording apparatus 100 can obtain the laser irradiation position without requiring positional information from the optical disk D. And thus, the optical disk recording apparatus 100 is not limited to only a specially manufactured optical disk D wherein a pregroove (a guide groove) is formed in the thermo sensitive face, and a visual image consonant with image information can be formed on the thermo sensitive face where no pregroove is formed and no positional information is provided in advance.

C. Modifications

The present invention is not limited to the above embodiment, and can be variously modified as follows.

(Modification 1)

Figure 19:
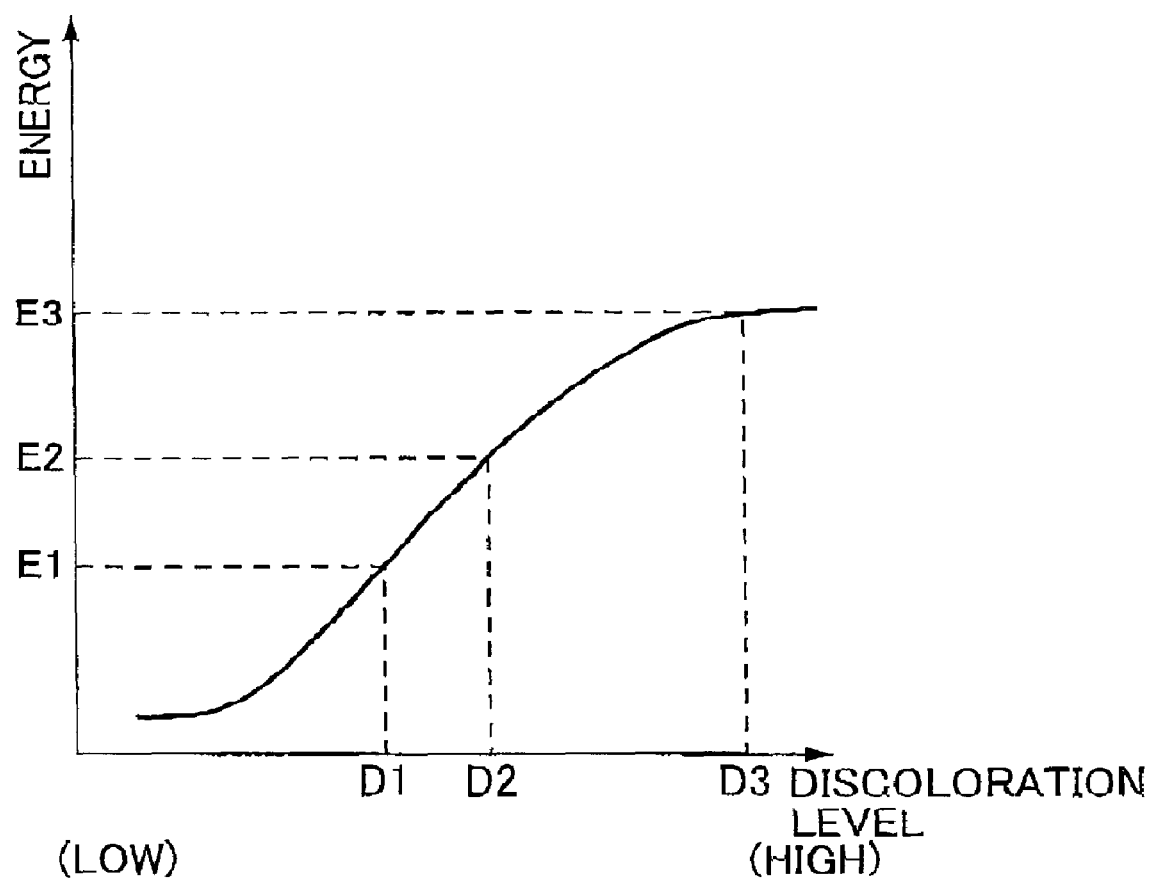
FIG. 19 is a diagram for explaining a method whereby the optical disk recording apparatus expresses the density of a visual image that is formed on the thermo sensitive face of the optical disk.

In the above embodiment, in accordance with the gradation level for each coordinate point that is included in image information received from the host PC 110 in consonance with a visual image, the laser irradiation period is controlled so as to express the density of the visual image formed on the thermo sensitive face of the optical disk D. However, information indicating the gradation level of each coordinate point may be employed to change the write level of the laser power, and the density of a visual image may be expressed. For example, as is shown in FIG. 19, when the thermo sensitive face (photosensitive layer 205: see FIG. 1) of the optical disk D has a characteristic according to which the discoloration level is moderately changed in accordance with the amount of thermal energy applied thereto, the discoloration level of the thermo sensitive face is changed to D1, D2 or D3 by the application of different amounts of energy, such as E1, E2 or E3. Therefore, as for the optical disk D wherein the thermo sensitive face having this characteristic is formed, the write level of the laser light need only be changed in accordance with the gradation level that is indicated for each coordinate point in the image information. Thus, portions at the individual coordinate points on the optical disk D can be discolored in accordance with the gradation levels, and the density of the visual image can be expressed.

Figure 20:
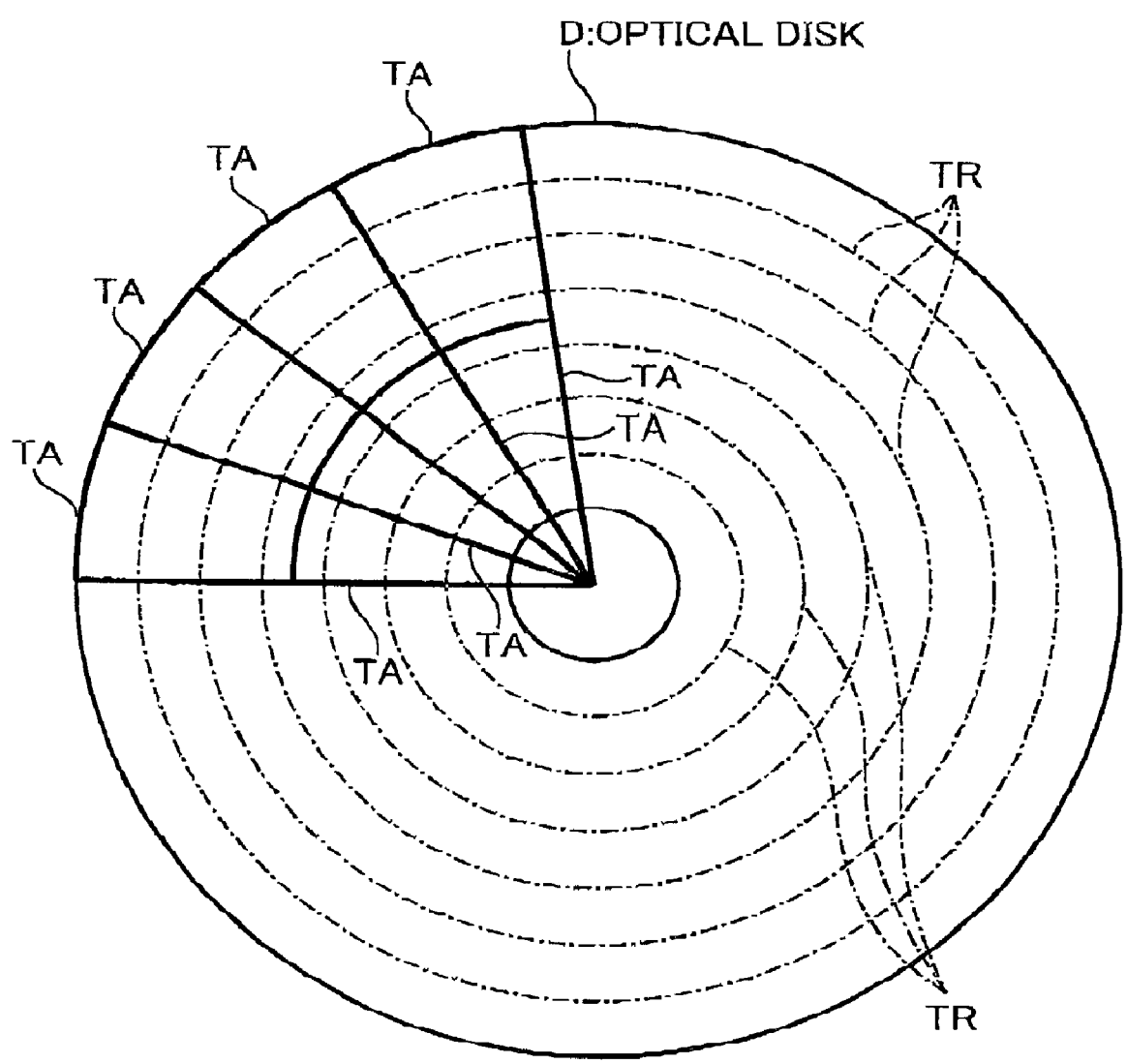
FIG. 20 is a diagram for explaining a method whereby the optical disk recording apparatus expresses the density of a visual image that is formed on the thermo sensitive face of the optical disk.

In addition to this method for changing the write level value in accordance with the gradation level, multiple adjacent coordinate points may be defined as a single unit area for expressing the gradation level, and the laser irradiation periods for these coordinates included in the unit area may be correlated with each other, so that the density of the visual image formed on the thermo sensitive face of the optical disk D can be expressed. More specifically, as is shown in FIG. 20, according to this optical disk recording apparatus 100, the laser irradiation position of the optical pickup 10 is moved along circular paths TR (indicated by chained lines in FIG. 20) multiple times, and the power value of the laser beam emitted during this travel is changed to the write level or the servo level in accordance with the image information. As a result, a visual image can be formed.

In this modification fan-shaped regions, including a predetermined number (three in this example) of adjacent circular paths TR that belong to fan-shaped portions obtained by dividing the optical disk D, are defined as unit area TA (indicated by thick lines in FIG. 20). The timings for emitting the laser beam to irradiate the three circular paths TR that belong to the unit areas TA are controlled so that the density of the visual image can be expressed in the individual unit areas TA.

For example, to form an image having a higher density in a specific unit area TA, the laser irradiation period is so adjusted that, as is shown in the upper portion in FIG. 21, all of the three circular paths TR that belong to this specific unit area TA are discolored (the discolored portions are shown as solid portions). That is, image information is prepared so that the drive pulse generator 35 generates the drive pulses shown in the lower portion in FIG. 21, and while the laser irradiation position is passing along the three circular paths TR that belong to the pertinent unit area TA, the laser beam is continuously emitted at the write level.

For forming an image having a very low density in a specific unit area TA (the density is not zero), the laser irradiation period is so adjusted that, as is shown in the upper portion in FIG. 22, of the three circular paths TR that belong to the specific unit area TA, only a small portion of the innermost circular path TR is discolored. That is, image information is prepared so that the drive pulse generator 35 generates the drive pulses shown in the lower portion in FIG. 22 whereat the laser beam at the write level is emitted only for one part of the period during which the laser irradiation position is passing along the innermost circular path TR.

To express a specific unit area TA at an intermediate density, the laser irradiation period is adjusted so that, as is shown in the upper portion in FIG. 23, of three circular paths TR that belong to the unit area TA, the entire portion along the innermost circular path TR and the half portion along the middle circular path TR are discolored. Specifically, image information is prepared so that the drive pulse generator 35 generates the drive pulses shown in the lower portion in FIG. 23 whereat the laser beam at the write level is emitted for a period during which the laser irradiation position is passing along the innermost circuit path TR, and for one part of the period during which the laser irradiation position is passing along the intermediate circular path TR.

The host PC 110 generates, in advance, image information for which the above gradation expression is provided for each unit area TA, and transmits the image information to the optical disk recording apparatus 100. Therefore, a visual image for which the gradation expression is provided for each unit area TA can be formed on the thermo sensitive face of the optical disk D.

(Modification 2)

In the above described embodiment, when a visual image has been formed by emitting the laser beam while the optical disk D is rotated once from the reference position, the feeding control process is performed, i.e., the optical pickup 10 is moved a predetermined distance in the outer direction of the diameter, and the laser irradiation position is moved very near the surface of the optical disk D. However, some mechanisms for driving the optical pickup 10 in the direction of the diameter can not control the travel distance represented by units of 20 μm. For an optical disk recording apparatus wherein such a driving mechanism is mounted, the size of a portion on the optical disk that the laser beam can not radiate is increased, and as a result, the quality of a visual image formed on the thermo sensitive face is deteriorated.

Figure 24:
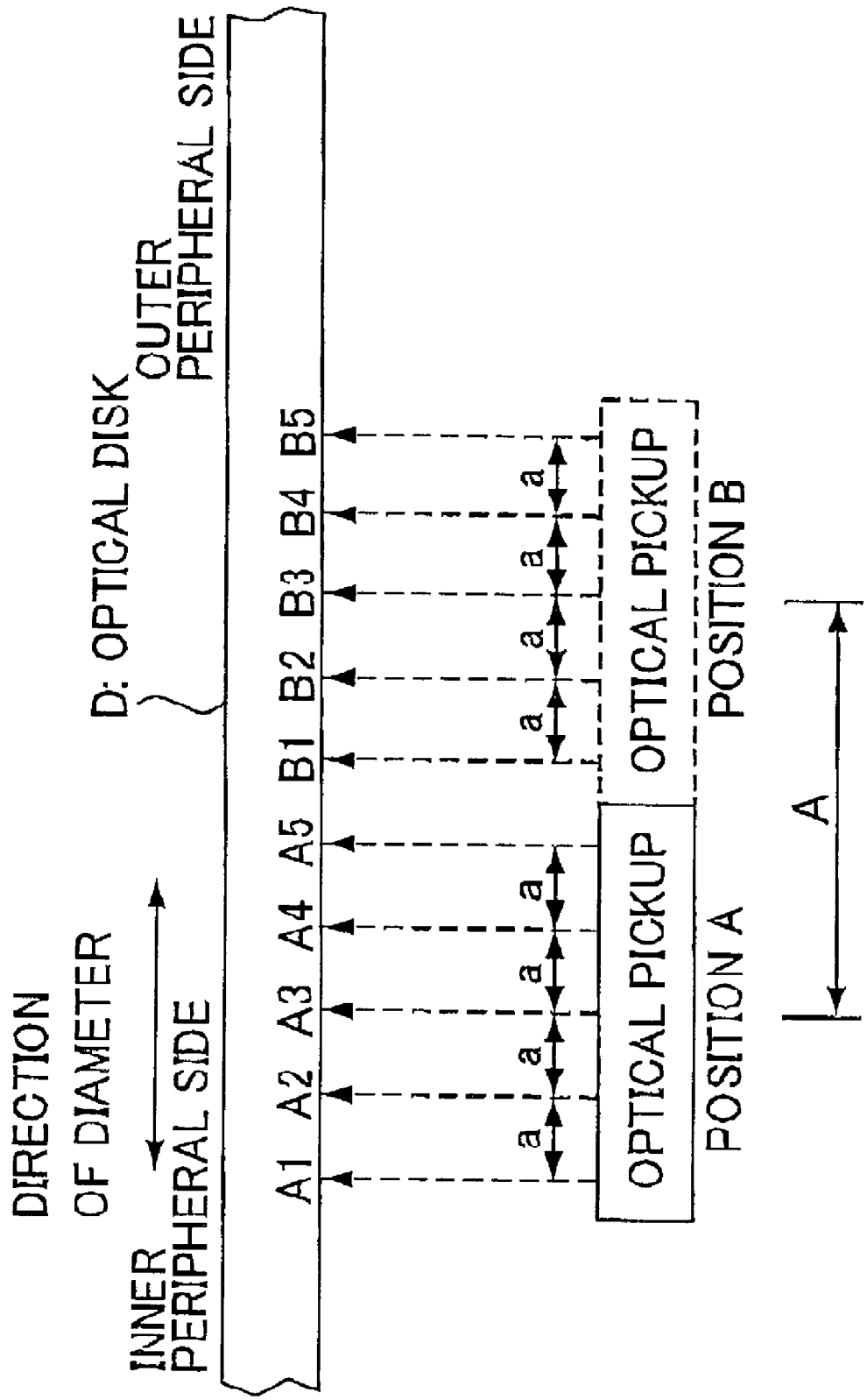
FIG. 24 is a diagram for explaining a method for moving a laser irradiation position in the direction of the diameter of the optical disk when the optical disk recording apparatus forms a visual image on the thermo sensitive face of the optical disk.

When the adjustability of the drive means for moving the optical pickup 10 in the direction of the diameter is low, the control by the drive means for moving the optical pickup 10 in the direction of the diameter and the tracking control of the optical pickup 10 may be employed to adjust the laser irradiation position along the diameter using a smaller unit, such one of 20 μm. More specifically, as is shown in FIG. 24, first, the diameter-direction drive means, such as a stepping motor, moves the optical pickup 10 to position A. Then, while the optical pickup 10 is fixed at position A, tracking control is performed so as to set the laser irradiation position along the diameter to position A1. Then, with the irradiation position set at A1, the laser beam is emitted while the optical disk D is rotated, so that a visual image is formed. And when the visual image formation with the irradiation position fixed at A1 is terminated, the laser irradiation position is moved outward distance a by the tracking control and is set at position A2, while the optical pickup 10 is fixed to the position A. Thereafter, while the optical disk D is rotated under this condition, the laser beam is emitted to form a visual image. Similarly, while the optical pickup D is fixed to the position A, the laser irradiation position is moved in the order A3, A4 and A5 by the tracking control, and image formation is continued.

When the image formation is completed while the laser irradiation position is set to position A5, the drive means moves the optical pickup 10 outward a distance A, and sets the optical pickup 10 at position B. When the optical pickup 10 is fixed at the position B, the laser irradiation position is moved outward by the tracking control the distance a to positions B1, B2, B3, B4 and B5, and the image forming process is performed. Since the control exercised by the stepping motor for moving the optical pickup 10 in the direction of the diameter and the tracking control are employed, the laser irradiation position can be moved smaller distance units, even when the adjustability of the drive means for moving the optical pickup 10 in the direction of the diameter is low.

(Modification 3)

The optical disk recording apparatus 100 for the above embodiment employs the CAV method whereby, for forming a visual image, a laser beam is emitted while the optical disk D is rotated at a consistent angular velocity. However, the CLV method whereby the linear velocity is consistent may be employed. When the CAV method is employed, in order to obtain a visual image having a high quality, the write level value for the laser beam should be increased as the laser irradiation position is moved outward across the optical disk D; however, when the CLV method is employed, the write level value need not be changed. Therefore, the quality of an image formed on the thermo sensitive face of the optical disk will not be deteriorated due to the fluctuation of the target laser power value.

(Modification 4)

Further, in the above embodiment, the laser power controller 20 controls the laser power based on the light-receiving results obtained at the front monitor diode 53$a$ of the optical pickup 10, so that the laser beam is emitted at the target write level or the target servo level (see FIG. 7). In addition, in the above embodiment, the light-receiving results obtained by the front monitor diode 53$a$ when the laser diode 53 emits the laser at the target write level are employed, so that the intensity of the laser beam emitted by the laser diode 53 can match the target write level. Furthermore, the light-receiving results obtained by the front monitor diode 53$a$ when the laser beam is emitted by the laser diode 53 at the target servo level are employed, so that the intensity of the laser beam emitted by the laser diode 53 can match the target servo level value.

In the process for controlling the laser power by using the target write level and the target servo level, in addition to the results obtained by receiving the laser beam emitted at these target levels, the results obtained by receiving the laser beam emitted at the target servo level may also be employed to control the laser power at the target write level, as well as at the target servo level. More specifically, based on the results (the current value) obtained by receiving the laser beam emitted at the target servo level, the laser power controller 20 obtains a current value SI that is to be supplied to the laser diode 53 in order to permit the laser diode 53 to emit the laser beam at the target servo level value SM, as is shown in the upper portion in FIG. 25. When the current value SI is obtained that is to be supplied for the emission of the laser beam at the target servo level SM, as is shown in the lower portion in FIG. 25 a relationship (a linear function) between a supplied current value, which was acquired in advance through an experiment, and the output laser power is obtained for the laser diode 53 by employing the current value SI and an inclination a that is used to represent this relationship by using the linear function. Then, the laser power circuit 20 employs the obtained relationship and the target write level WM set by the control unit 16 to obtain a value WI for a current that is to be supplied to the laser diode 53 in order to emit the laser beam at the write level. The laser power controller 20 permits the laser driver 19 to supply the thus obtained current WI to the laser diode 53. In this manner, the emission of the laser beam at the write level can be controlled without using the results obtained by receiving the laser beam that is emitted at the target write level.

In the above embodiment and this modification, while the laser beam is being emitted for forming a visual image, the light-receiving results at the front monitor diode 53a are employed to perform feedback control for the laser power. However, the feedback control may not be performed during visual image formation and the laser power may be controlled, so that a laser irradiation test is conducted before the visual image formation, and the obtained light-receiving results for the front monitor diode 53a are employed to supply a current value to the laser diode 53. When a period required for image forming is short, the travel of the optical pickup 10 and the fluctuation of the ambient environment (the temperature) is small, so that the laser power may be satisfactorily controlled even without feedback control being performed. Therefore, an optical disk recording apparatus that can perform image forming within a short period of time can also employ the laser power control that does not accompany the feedback control.

(Modification 5)

In the above embodiment, the disk ID is read from the outermost edge of the thermo sensitive face of the optical disk D to identify the disk type loaded in the optical disk recording apparatus 100, and the laser power control is exercised in accordance with the disk type identified (see FIG. 12). A disk ID may be read from the read-in area of the recording face of the optical disk D, and during the process for forming a visual image on the thermo sensitive face of the optical disk D, the laser power control may be exercised in accordance with the disk type that is identified by the disk ID. In order to obtain the disk ID from the read-in area of the recording face, first, the user loads the optical disk D to direct the recording face toward the optical pickup 10, and the optical disk recording apparatus 100 reads the disk ID from the read-in area for the optical disk D, and instructs the user to reverse and re-insert the disk. When the optical disk D is set so that the thermo sensitive face is directed toward the optical pickup 10, the optical disk recording apparatus 100 can perform the laser power control in accordance with the disk ID obtained from the read-in area, and form a visual image on the thermo sensitive face of the optical disk D.

(Modification 6)

Figure 26:
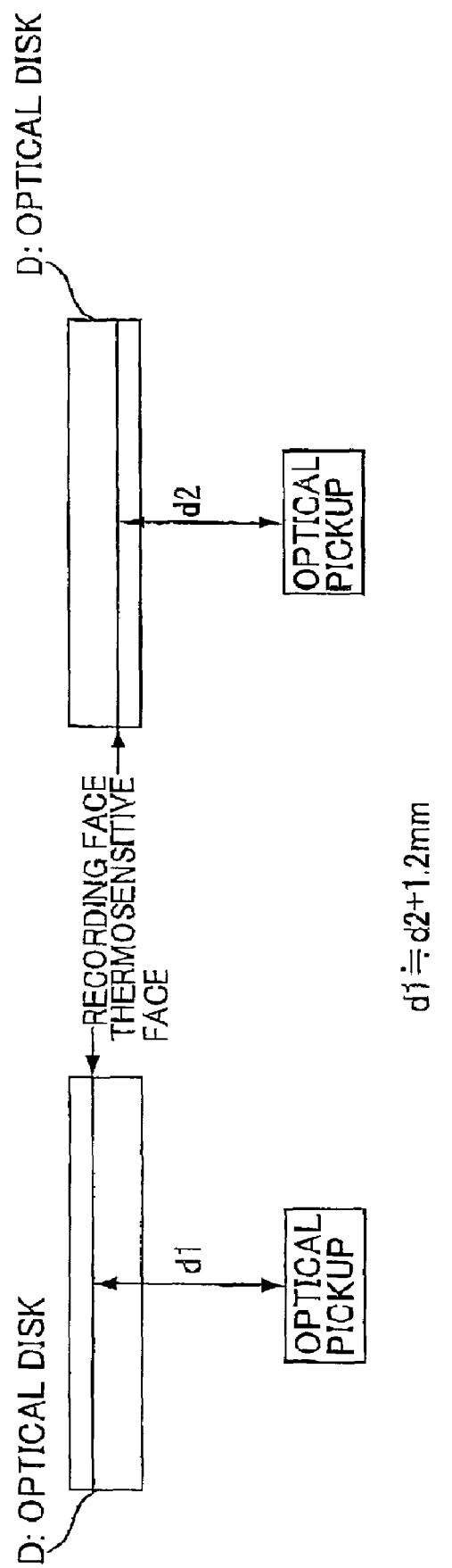
FIG. 26 is a diagram showing the positional relationship between the optical disk and the optical pickup for a case wherein the optical disk is set up in the optical disk recording apparatus so that the thermo sensitive face is directed toward the optical pickup, and for a case wherein the optical disk is set up so that the face on the side opposite the thermo sensitive face is directed toward the optical pickup.

As was described in the above embodiment, the optical disk recording apparatus 100 uses the individual sections of the optical pickup 10 that records information to the recording face, so that a visual image can be formed on the thermo sensitive face, which is the reverse side relative to the recording face. As for a CD-R, the protective layer 201 overlaid on the recording layer 202 in FIG. 1 has a thickness of 1.2 mm, while the thickness of the protective layer 206 on the other face is very small. Therefore, as is shown in FIG. 26, distances d1 and d2 (relative positional relationships) between the position of the layer of the optical disk D, which a laser beam should irradiate, and the positions of the optical pickup 10 differ by about 1.2 mm, depending on which face, either the recording face or the thermo sensitive face, is directed toward the optical pickup 10 when the optical disk D is set up.

When the optical pickup 10 is designed on the assumption that the distance d1 between the optical pickup 10 and the recording face of the optical disk D is a focusing distance, its focus actuator 64 (see FIG. 3) may not satisfactorily perform focusing control when the distance between the optical pickup 10 and the face to be irradiated reaches d2. Therefore, a mechanism may be provided whereby, when the optical disk D is set with the thermo sensitive face directed toward the optical pickup 10, the optical disk D is held at a position separated from the optical pickup 10 by a distance of about 1.2 mm, so that the distance between the thermo sensitive face and the optical pickup 10 substantially matches d1.

Figure 27:
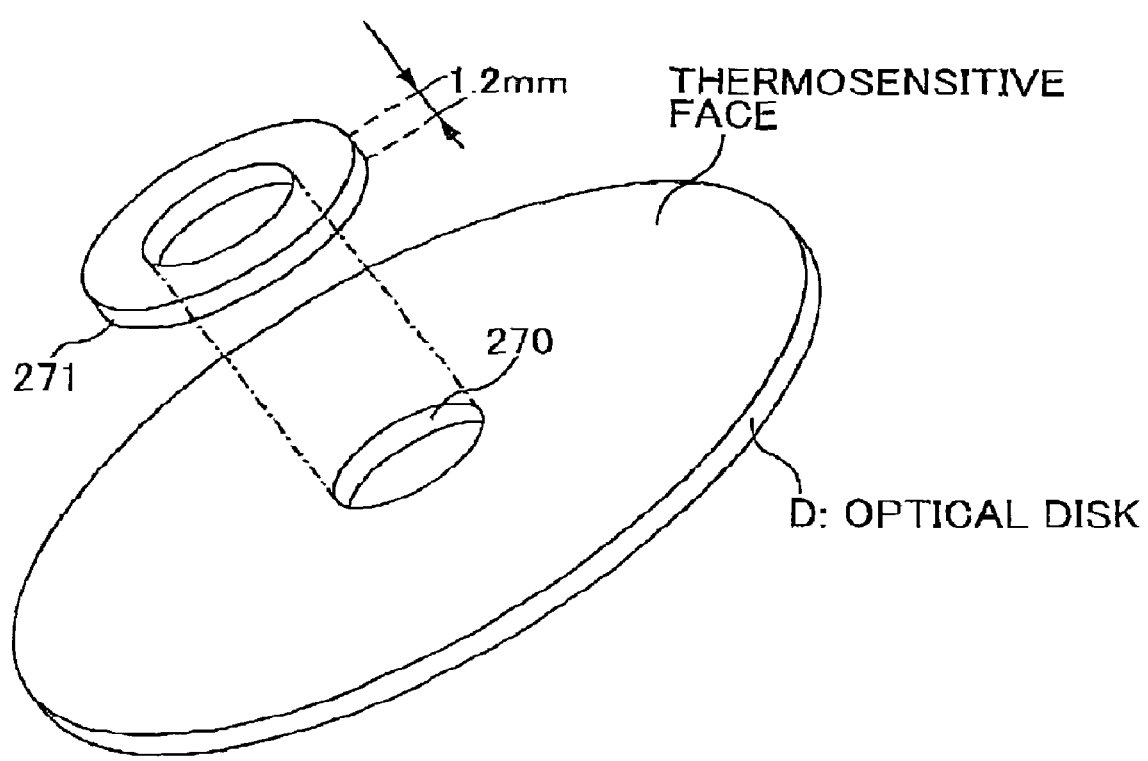
FIG. 27 is a diagram showing the external appearance of an adaptor for adjusting the positional relationship between the optical disk and the optical pickup.

As this mechanism, as is shown in FIG. 27, an adaptor (relative position adjustment means) 271 may be employed that is detachable from a chucking portion 270 in the center of the optical disk D. When the optical disk D is to be loaded in the optical disk recording apparatus 100 so that the thermo sensitive face thereof is directed toward the optical pickup 10, the adaptor 271 need only be mounted for the optical disk D.

Furthermore, the optical disk recording apparatus 100 may include a mechanism that can be moved between a position near where the optical disk D is loaded into the optical recording apparatus 100 and a position at a distance therefrom, and that changes the position whereat the optical disk D is held. Only when the optical disk D is set up so that the thermo sensitive face is directed toward the optical pickup 10 may the mechanism be moved to the position near where the optical disk D is set up and used to adjust the position whereat the optical disk D is held.

Figure 28:
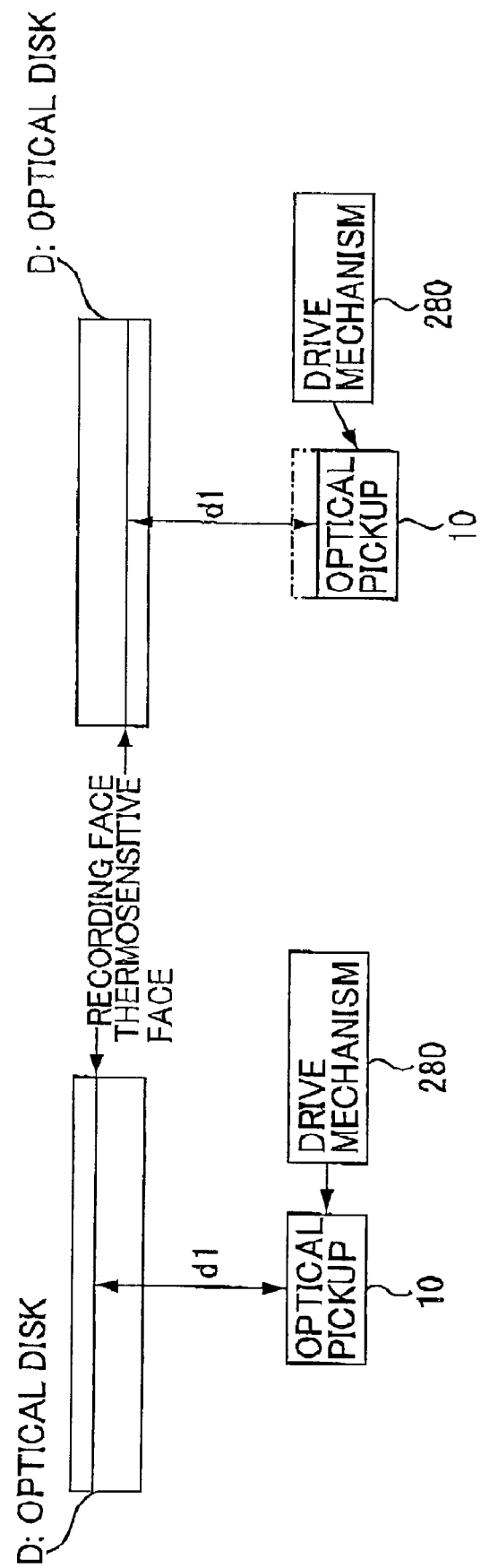
FIG. 28 is a schematic diagram showing the configuration of an optical disk recording apparatus that has a function for adjusting the positional relationship between the optical disk and the optical pickup.

In addition to the use of the adaptor 271 to move the position of the optical disk D away from the optical pickup 10, as is shown in FIG. 28, a drive mechanism (relative position adjustment means) 280 may be provided whereby, when the optical disk D is set up with the thermo sensitive face directed toward the optical pickup 10, the optical pickup 10 is moved away from the optical disk D until the distance between the thermo sensitive face and the optical pickup is d1.

(Modification 7)

Figure 29:
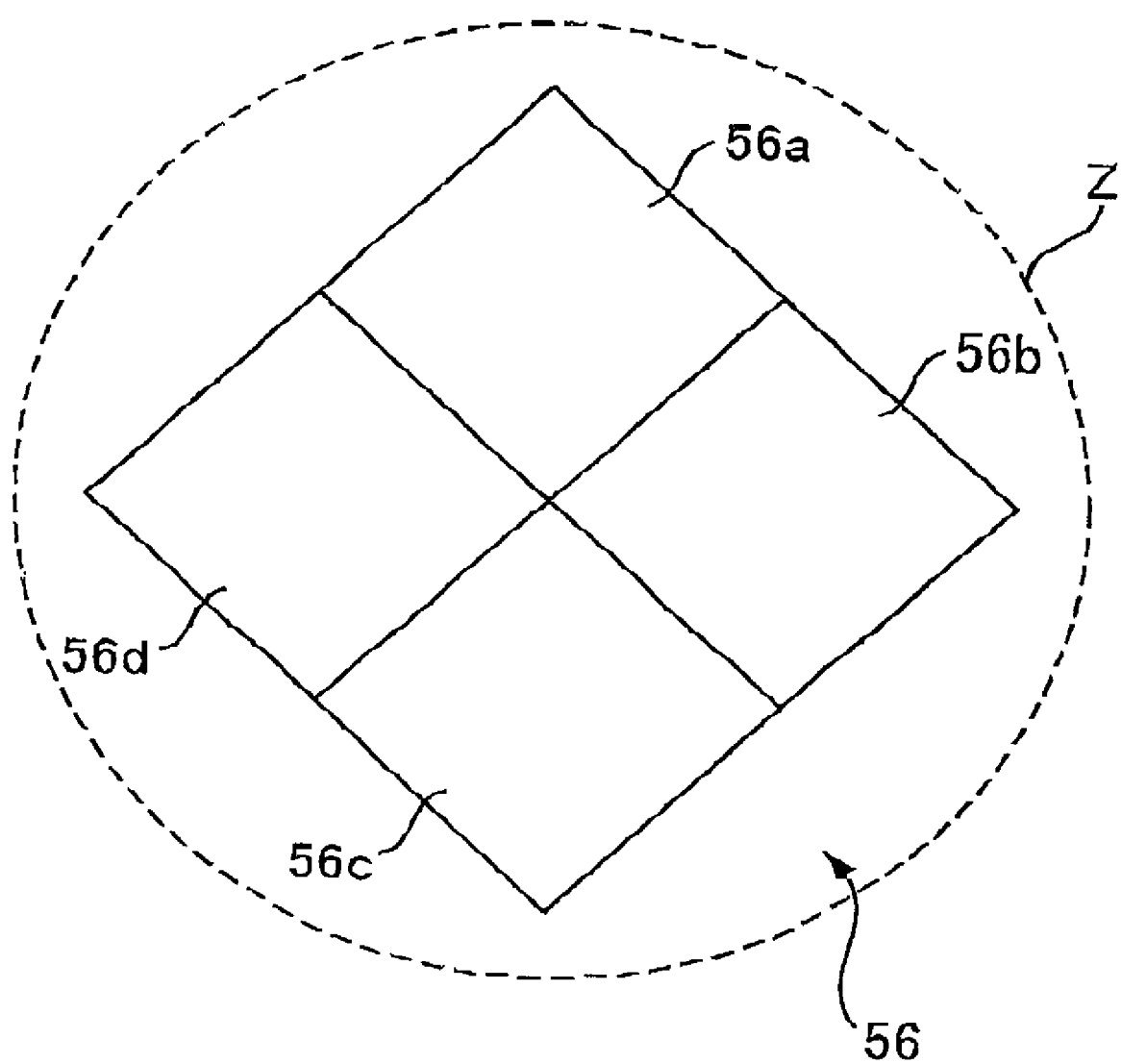
FIG. 29 is a diagram for explaining a method for increasing the beam spot diameter of a laser beam to be emitted for the thermo sensitive face of the optical disk.

In the above embodiment, the focusing control has been performed in accordance with light that is returned from the optical disk D and is received by the light-receiving element 56 (see FIG. 3) of the optical pickup 10, and for this focusing control, a laser beam having a spot diameter larger than that for recording data on the recording face has been emitted is used to irradiate the thermo sensitive face of the optical disk D. Further, in the embodiment, in order to Increase the spot diameter, the focus actuator 64 was driven so that the light-receiving results obtained by the light-receiving element 56 were the elliptical shapes B and C shown in FIG. 13. Instead of the light values received in the four areas 56a, 56b, 56c and 56d of the light-receiving element 56, the total amount of light received in all the areas of the light-receiving element 56 may be employed to perform focusing control, so that the thermo sensitive face of the optical disk D can be irradiated with a laser beam having a spot diameter larger than the one when the elliptical shapes B and C are obtained as the light-receiving results. That is, when the spot diameter of the laser beam to be emitted for the thermo sensitive face of the optical disk D is increased, the light-receiving element 56 can not receive all the returning light, and as is indicated by circle Z in FIG. 29, returning light for an area larger than the light-receiving area of the light-receiving element 56 is obtained. In other words, the total amount of light received by the light-receiving element 56 is reduced. Therefore, when the servo circuit 13 drives the focus actuator 64, so that the total amount of light received by the light-receiving element 56 is smaller than the total amount of light received when the light-receiving results, such as the circle A and elliptics B and C in FIG. 13, are obtained, a laser beam having a larger spot diameter can be emitted for the thermo sensitive face of the optical disk D.

(Modification 8)

When the protective layer 205 (see FIG. 1) of the optical disk D is formed of a very transparent material, even when the optical disk D is set up with the thermo sensitive face directed toward the optical pickup 10, the optical disk recording apparatus 100 can detect, from light (reflective light) returned from the optical disk D, a pregroove (guide groove) formed in the recording face of the optical disk D. More specifically, unlike the case wherein the laser beam is emitted for the recording face, the returning write level is high when the pregroove is irradiated with the laser beam, while the returning write level is low when the land portion is irradiated. Therefore, the pregroove can be detected by examining the level of the returning light, and as a result, the tracking control can be performed along the pregroove.

When the optical disk D is set up with the thermo sensitive face directed toward the optical pickup 10, and when the tracking control is enabled along the pregroove formed in the recording face on the reverse side, the laser beam may be emitted to form a visual image, while the laser irradiation position is moved along the pregroove. When the pregroove formed in the recording face on the reverse side relative to the thermo sensitive face is detected to perform the tracking control in order to move the laser irradiation position along the pregroove, the spindle motor 11 is rotated in the direction opposite to that when data is recorded to the recording face, and the optical disk D is rotated in the reverse direction. The reason the optical disk is rotated in the reverse direction will now be described while referring to FIG. 30. As is shown in the upper portion in FIG. 30, when a spiral pre-groove PB is formed in the recording face of the optical disk D, viewed from the recording face it is a clockwise spiral. But when, as is shown in the lower portion in FIG. 30, the pregroove PB is viewed from the thermo sensitive face, which is the opposite face, it is a counter-clockwise spiral. Therefore, when the optical disk D is rotated from the innermost position PBS along the pre-groove PB in the same direction as it is rotated for data recording, the laser irradiation position can not be moved along the pregroove. Therefore, when the laser irradiation position is to be moved along the pregroove PB in order to form a visual image by emitting the laser beam for the thermo sensitive face of the optical disk D, the optical disk D is rotated in the direction opposite to the direction in which the data is recorded to the recording face.

Therefore, when the laser irradiation position is moved along the pregroove PB and the laser irradiation timing and the laser power are controlled in accordance with image information in order to form a visual image in the same manner as in the embodiment, the control unit 16 need only instruct the servo circuit 13 to rotate the spindle motor 11 in the direction opposite to the direction in which the data is recorded to the recording face.

Further, when a visual image is to be formed on the thermo sensitive face while the laser irradiation position is moved along the pregroove PB formed in the recording face, assuming that the laser irradiation start position is defined as the outermost position PBE of the pregroove PB, the laser irradiation position can be moved along the pregroove PB even when the optical disk D is rotated in the same direction as that in which it is rotated for recording.

(Modification 9)

Figure 31:
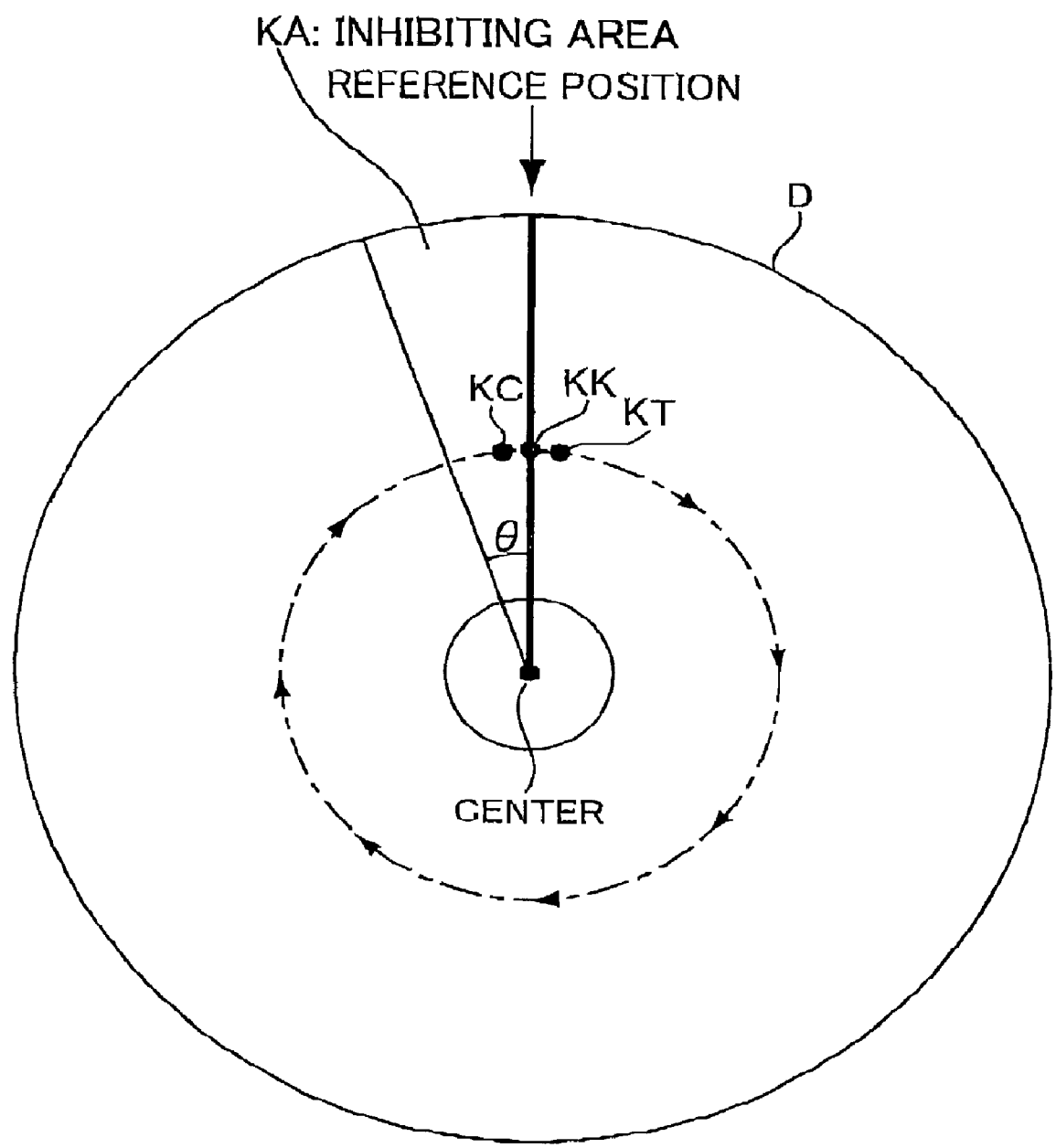
FIG. 31 is a diagram for explaining an inhibiting area of the optical disk for which laser irradiation by the optical disk recording apparatus for visual image formation is inhibited.

In the above embodiment, the control unit 16 may inhibit the irradiation performed by an image forming laser beam (a laser beam at a write level) in a predetermined inhibiting area KA of the thermo sensitive face of the optical disk D in FIG. 31. When the laser irradiation position is moved clockwise from the above described reference position (see FIG. 16), as is shown in FIG. 31, the inhibiting area KA is a fan-shaped area having a predetermined angle θ in the counterclockwise direction from the reference position. That is, when the optical disk D is rotated and when the laser irradiation position is moved from the reference position and the laser beam is emitted to form a visual image, the inhibiting area KA is the area the laser irradiation position passes through immediately before the laser irradiation position is returned to the reference position.

To inhibit the formation of a visual image in the inhibiting area KA, the control unit 16 need only perform data conversion, i.e., change to "0" the gradation level of the coordinates for the inhibiting area KA in the image information supplied from the host PC 110. Through this data conversion, even when the drive pulse generator 35 accurately generates a drive pulse in accordance with the data obtained by data conversion, the laser beam at the write level is not emitted when the laser irradiation position passes through the inhibiting area KA, and as a result, a visual image can not be formed in the inhibiting area KA.

When the laser irradiation for forming a visual image is halted for the inhibiting area KA, the following effects are obtained. When the image forming is performed in synchronization with the clock signal received from the PLL circuit 33, the rotational velocity of the spindle motor for one revolution is varied slightly, and accordingly, the cycle of the clock signal output by the PLL circuit 33 is fluctuated. Due to the fluctuation of the clock signal, which is a synchronization signal for image forming, it may be that, as is shown in FIG. 31, the trajectory (indicated by a chained line in FIG. 3) of the laser irradiation position will draw substantially one revolution after the laser irradiation to form a visual image was started at the reference position KK, and that the laser beam will be emitted at a position KT where the laser beam has passed through the reference position, while the laser beam is supposed to be emitted to express an image at a position KC immediately following the reference position. That is, when emitted the laser beam is overlapped, so that the laser beam that is originally supposed to be emitted to express the image at the position KC, immediately before the reference position, is also emitted at the position KT in an area in which the laser beam has already been emitted to form a visual image. As a result, a failure in the thus obtained visual image will occur. Therefore, even when the click signal generated by the PLL circuit 33 is fluctuated, the image information is converted fin order to set the inhibiting area KA, so that a failure caused by the use of the laser beam to form in the same position a second visual image can be prevented.

(Modification 10)

Figure 32:
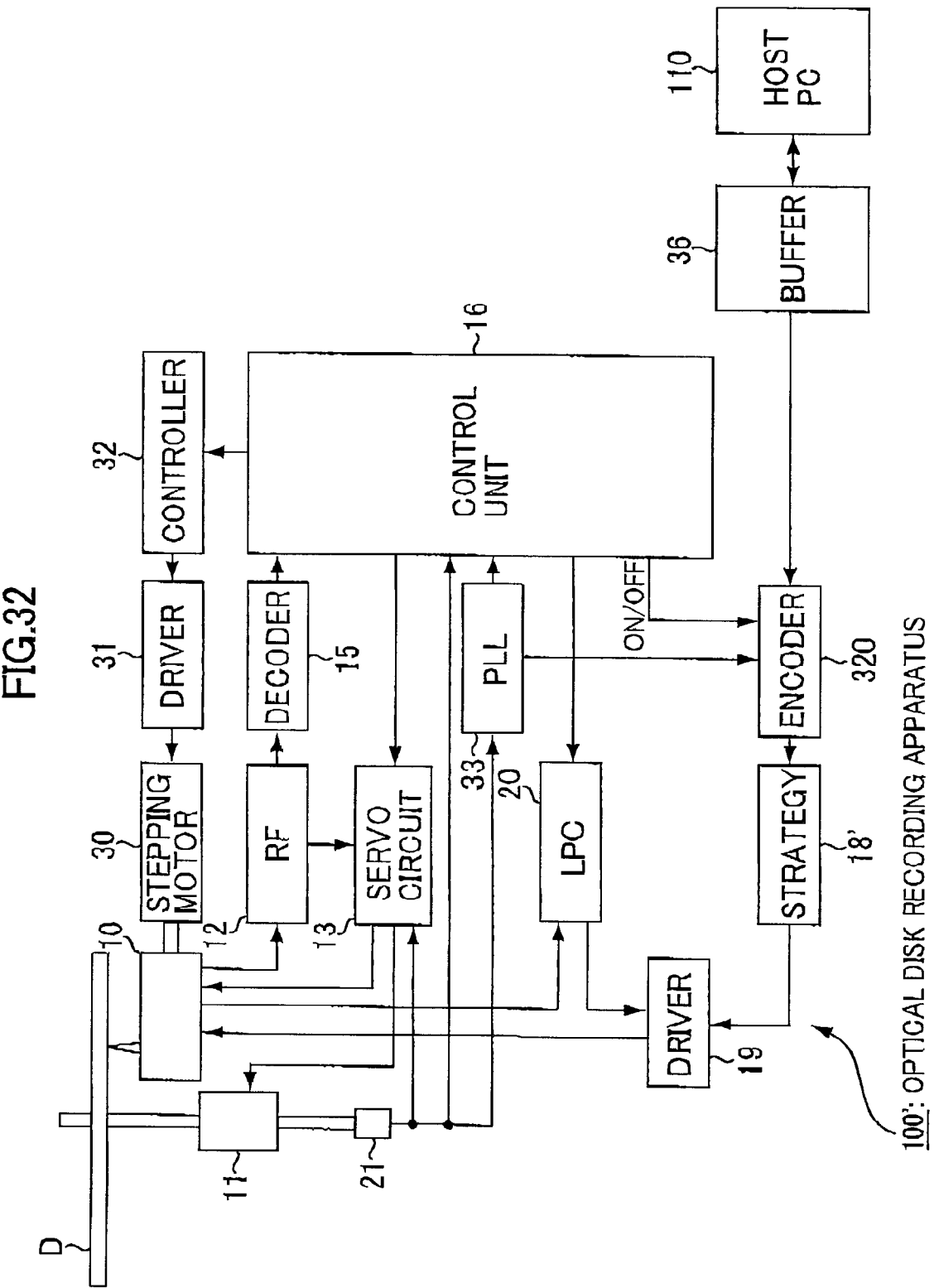
FIG. 32 is a block diagram showing the configuration of a modification for the optical disk recording apparatus.

An optical disk recording apparatus 100' having the configuration shown in FIG. 32 may be employed instead of the optical disk recording apparatus 100 for the above embodiment. As is shown in FIG. 32, the optical disk recording apparatus 100 differs from the optical disk recording apparatus 100 in the above embodiment in that the FIFO memory 34 and the drive pulse generator 35 are not included and an encoder 320 is provided instead of the encoder 17.

The encoder 320, as well as the encoder 17 in the embodiment, is a circuit for performing EFM modulation and CIRC (Cross Interleave Reed-Solomon Code) conversion of received data. The encoder 320 temporarily accumulates the received data in a memory, performs the above modulation for the accumulated data, and outputs the resultant data to a strategy circuit 18'. In addition, based on a modulation ON/OFF signal received from a control unit 16, the encoder 320 determines whether the data received from a buffer memory should be output through a process such as the EFM modulation, or should be output without the EFM modulation being performed. When a modulation ON signal is received from the control unit 16, the encoder 36 performs the EFM modulation for the data received from the buffer memory 36, and outputs the resultant data to the strategy circuit 18'. When the modulation OFF signal is transmitted by the control unit 16, in synchronization with a clock signal received from a PLL circuit 33, the encoder 320 outputs the data received from the buffer memory 36, without performing any modulation.

Upon receiving an instruction that is entered by a user through a user interface (not shown), the control unit 16 outputs a modulation ON/OFF signal to the encoder 320. More specifically, the control unit 16 outputs a modulation OFF signal when an instruction is received from the user to form a visual image on the thermo sensitive face, or outputs a modulation ON signal when an instruction is received to record data to the recording face. Instead of outputting a modulation ON/OFF signal in accordance with the user's instruction, the control unit 16 may output a modulation ON/OFF signal in accordance with the face of the optical disk that is directed toward the optical pickup 10. In this case, a modulation OFF signal must be output when the optical disk D is set up with the thermo sensitive face directed toward the optical pickup 10, and a modulation ON signal must be output when the optical disk D is set up with the recording face directed toward the optical pickup 10.

With this configuration, when an instruction is issued by the user to record data to the recording face, the control unit 16 outputs the modulation ON signal to the encoder 320. The write data to be recorded to the recording face of the optical disk D is transmitted from a host PC 110 to the buffer memory 36, and is then transmitted from the buffer memory 36 to the encoder 320. Upon receiving the modulation ON signal, the encoder 320 performs the EFM modulation for the write data received from the buffer memory 36, and outputs the resultant data to the strategy circuit 18'. The strategy circuit 18' performs time axial correction of the EFM modulated data, generates a drive pulse to drive a laser driver 19, and outputs the drive pulse to the laser driver 19. In accordance with the drive pulse, the laser driver 19 supplies a drive current to the laser diode 53 (see FIG. 3) of the optical pickup 10, and the optical pickup 10 emits the laser beam for the recording face of the optical disk D in order to record the data supplied from the host PC 110.

When an instruction is issued by the user to form a visual image on the thermo sensitive face, the control unit 16 outputs the modulation OFF signal to the encoder 320. Image information that corresponds to a visual image to be formed on the thermo sensitive face of the optical disk D is transmitted from the host PC 110 to the buffer memory 36, and is then transmitted from the buffer memory 36 to the internal memory of the encoder 320. Upon receiving the modulation OFF signal, the encoder 320 does not perform any modulation for the image information received from the buffer memory 36, and sequentially outputs data (information indicating a gradation level) for the individual coordinates to the strategy circuit 18' in synchronization with the clock signal supplied by the PLL circuit 33. The strategy circuit 18', as well as the drive pulse generator 35 in the above embodiment, generates a drive pulse based on data indicating a gradation level for each coordinate point that is sequentially supplied, and outputs the drive pulse to the laser driver 19. In accordance with the drive pulse, the laser driver 19 supplies the drive current to the laser diode 53 (see FIG. 3) of the optical pickup 10, and the optical pickup 10 emits the laser beam to form on the thermo sensitive face of the optical disk D a visual image that is consonant with the image information transmitted by the host PC 110.

As is described above, since the encoder 320 can perform or halt modulation depending on visual image formation or data recording, the FIFO memory 34 and the drive pulse generator 35 used only for visual image formation can be removed, and with a simple structure, the optical disk recording apparatus 100' can obtain a visual image formation function and a data recording function.

(Modification 11)

A visual image may also be formed on the recording face (recording layer 202) of the optical disk D. Since it is well known that when a laser beam is emitted for the recording layer 202 that is equal to or greater than a predetermined intensity, the reflectivity at the irradiated portion is changed, a visual image can be formed by emitting the laser beam across a large range that can be identified visually. Or, when the recording layer 202 is formed of a material the state of which is changed, e.g., the laser irradiation area is hollowed out or raised, a visual image can also be formed by using the property of this material.

To form a visual image on the recording face (recording layer 202), the data for forming a visual image need only be recorded along the guide groove (pregroove) formed in the recording layer 202. Further, as well as when a visual image is formed on the thermo sensitive face (photosensitive layer 205), the beam spot diameter of the laser beam to be emitted for the recording layer 202 may be increased, and the data may be recorded without using the guide groove. That is, the interval (track pitch) of the guide grooves is a very small value of only several μm, and even when data recording is not performed along the guide groove, the resolution of a visual image to be formed will not be reduced. Strictly speaking, the surface of the recording layer 205 is rough because the guide grooves are formed therein; however, since the depth of the grooves is a small value of merely several μm, when forming a visual image the recording layer 202 can be regarded as being flat.

So long as the technique related to this invention is employed, a visual image can be formed not only on the thermo sensitive face (photosensitive layer 205) but also on the recording face (recording layer 202), without requiring any special apparatus.

(Modification 12)

When a visual image is formed on the recording layer 202 of the optical disk D, data can naturally not be recorded to the region bearing the visual image. Therefore, in the write area (recording layer 202) of the optical disk D, a region for forming a visual image may be determined in advance. For example, when original data recording is performed in an area extending from the innermost position of the disk to a predetermined position (address) and a visual image is formed on the outer area, the original area for recording data will not be lost.

Further, an area wherein no data is recorded (a non-recorded area) may be detected after the original data recording is completed, and a visual image may be formed in the detected non-recorded area.

(Modification 13)

Data (image information) to be recorded for forming a visual image may be stored in advance in the memory (not shown) of the optical disk recording apparatus 100. For example, data with which numerals 0 to 9 are to be recorded as visual images on the optical disk D are prepared in the memory. When the user designates a numeral to be formed on the optical disk D, the corresponding write data may be read from the memory and recorded to the optical disk D to form a visual image.

Furthermore, the regular data recording is performed outwardly across the disk, and when the data recording is completed, time stamp information indicating the recording date and time may be automatically generated as a visual image without a user's instruction being required. The time stamp information may be supplied from an external apparatus (host PC 110) to the optical disk recording apparatus 100.

Further, when the original data recording is completed, signature information indicating a user name and the contents of the write data may be generated as a visual image. Through manipulation by the user, the signature information need only be supplied by the host PC 110 to the optical disk recording apparatus 100. Or, the user may directly operate the optical disk recording apparatus 100 to enter (register) the signature information.

As is described above, according to the present invention, not only can data be recorded to the recording face of an optical disk, but also visible data can be recorded to the thermo sensitive face, without a new apparatus being separately prepared.

What is claimed is:

1. An optical disk apparatus for recording information by irradiating a laser beam onto an optical disk, comprising:

a pickup that is provided for irradiating the laser beam onto the optical disk having an optically recordable side formed with a guide groove in a circumferential direction of the optical disk and a thermally sensitive side which is the reverse side of the optically recordable side;

a scanning section that is provided for scanning the laser beam in the radial direction of the optical disk;

a recording control section operative when the optically recordable side of the optical disk is set to face the pickup for controlling the pickup and the scanning section to effect recording of information on the optically recordable side by irradiating and scanning the laser beam;

a servo section operative when the optical disk is set to face the thermally sensitive side to the pickup for servo-controlling the scanning section to enable the laser beam to track the guide groove formed in the side of the optically recordable side according to the laser beam reflected back from the thermally sensitive side of the optical disk; and a drawing control section operative when the thermally sensitive side of the optical disk faces the pickup for controlling the pickup to effect drawing of a visible image on the thermally sensitive side by irradiating the laser beam while the laser beam tracks the guide groove formed in the side of the optically recordable side.

2. The optical disk apparatus according to claim 1, wherein the scanning section comprises a rotary driver for rotating the optical disk and a radial feeder for moving the pickup in the radial direction of the rotated optical disk to thereby scan the laser beam over the optical disk, the rotary driver being operative during the drawing of the visible image for rotating the optical disk in a reverse direction.

3. The optical disk apparatus according to claim 1, wherein the servo section operates during the recording of the information onto the optically recordable side for controlling the scanning section to enable the laser beam to track the guide groove from an inner central portion of the optical disk to an outer peripheral portion of the optical disk, and the servo section operates during the drawing of the visible image onto the thermally sensitive side for controlling the scanning section to enable the laser beam to track the guide groove from the outer peripheral portion of the optical disk to the inner central portion of the optical disk.

* * * * *